(12) United States Patent
Bertero et al.

(10) Patent No.: US 9,666,214 B1
(45) Date of Patent: May 30, 2017

(54) FREE LAYER MAGNETIC READER THAT MAY HAVE A REDUCED SHIELD-TO-SHIELD SPACING

(71) Applicant: Western Digital (Fremont), LLC, Fremont, CA (US)

(72) Inventors: Gerardo A. Bertero, Redwood City, CA (US); Shaoping Li, San Ramon, CA (US); Qunwen Leng, Palo Alto, CA (US); Yuankai Zheng, Fremont, CA (US); Rongfu Xiao, Dublin, CA (US); Ming Mao, Dublin, CA (US); Shihai He, Fremont, CA (US); Miaoyin Wang, Fremont, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 14/862,895

(22) Filed: Sep. 23, 2015

(51) Int. Cl.
*G11B 5/39* (2006.01)
*G11B 5/115* (2006.01)

(52) U.S. Cl.
CPC .............. *G11B 5/39* (2013.01); *G11B 5/115* (2013.01); *G11B 5/3912* (2013.01); *G11B 5/3932* (2013.01); *G11B 2005/3996* (2013.01)

(58) Field of Classification Search
CPC ............................ G11B 5/3912; G11B 5/3932
USPC ........................................................ 360/319
See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |

(Continued)

*Primary Examiner* — Jefferson Evans
(74) *Attorney, Agent, or Firm* — Foley & Lardner LLP

(57) ABSTRACT

A magnetic read apparatus includes a read sensor, a shield structure and a side magnetic bias structure. The read sensor includes a free layer having a side and a nonmagnetic spacer layer. The shield structure includes a shield pinning structure and a shield reference structure. The nonmagnetic spacer layer is between the shield reference structure and the free layer. The shield reference structure is between the shield pinning structure and the nonmagnetic spacer layer. The shield pinning structure includes a pinned magnetic moment in a first direction. The shield reference structure includes a shield reference structure magnetic moment weakly coupled with the pinned magnetic moment. The side magnetic bias structure is adjacent to the side of the free layer.

21 Claims, 11 Drawing Sheets

(56) References Cited

U.S. PATENT DOCUMENTS

| | | |
|---|---|---|
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,546 B2 | 7/2003 | Gill |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,828 B2 | 1/2004 | Gill |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |

(56) References Cited

U.S. PATENT DOCUMENTS

| | | |
|---|---|---|
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,724,584 B2 | 4/2004 | Mack et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,738,236 B1 | 5/2004 | Mao et al. |
| 6,741,432 B2 | 5/2004 | Pinarbasi |
| 6,744,607 B2 | 6/2004 | Freitag et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,751,845 B2 | 6/2004 | Gill |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,798 B2 | 8/2004 | Gill |
| 6,781,927 B1 | 8/2004 | Heanuc et al. |
| 6,785,102 B2 | 8/2004 | Freitag et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,801,412 B2 | 10/2004 | Gill |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,856,493 B2 | 2/2005 | Pinarbasi |
| 6,859,343 B1 | 2/2005 | Alfoqaha et al. |
| 6,859,348 B2 | 2/2005 | Pinarbasi |
| 6,859,997 B1 | 3/2005 | Tong et al. |
| 6,861,937 B1 | 3/2005 | Feng et al. |
| 6,865,062 B2 | 3/2005 | Pinarbasi |
| 6,867,953 B2 | 3/2005 | Gill |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,933,042 B2 | 8/2005 | Gill |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,943,997 B2 | 9/2005 | Gill |
| 6,944,938 B1 | 9/2005 | Crue, Jr. et al. |
| 6,947,258 B1 | 9/2005 | Li |
| 6,947,264 B2 | 9/2005 | Gill |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,983,530 B2 | 1/2006 | Gill |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,035,059 B2 | 4/2006 | Gill |
| 7,038,889 B2 | 5/2006 | Freitag et al. |
| 7,041,985 B1 | 5/2006 | Wang et al. |
| 7,046,490 B1 | 5/2006 | Ueno et al. |
| 7,050,277 B2 | 5/2006 | Gill et al. |
| 7,054,113 B1 | 5/2006 | Seagle et al. |
| 7,057,857 B1 | 6/2006 | Niu et al. |
| 7,059,868 B1 | 6/2006 | Yan |
| 7,082,017 B2 | 7/2006 | Freitag et al. |
| 7,092,195 B1 | 8/2006 | Liu et al. |
| 7,092,220 B2 | 8/2006 | Gill et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,171,741 B2 | 2/2007 | Gill |
| 7,177,117 B1 | 2/2007 | Jiang et al. |
| 7,177,120 B2 | 2/2007 | Freitag et al. |
| 7,193,815 B1 | 3/2007 | Stoev et al. |
| 7,196,878 B2 | 3/2007 | Fox et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,245,463 B2 | 7/2007 | Gill |
| 7,248,431 B1 | 7/2007 | Liu et al. |
| 7,248,433 B1 | 7/2007 | Stoev et al. |
| 7,248,447 B2 | 7/2007 | Gill |
| 7,248,449 B1 | 7/2007 | Seagle |
| 7,265,946 B2 | 9/2007 | Gill |
| 7,268,980 B2 | 9/2007 | Gill |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,313,856 B2 | 1/2008 | Gill |

(56) References Cited

U.S. PATENT DOCUMENTS

| | | |
|---|---|---|
| 7,318,947 B1 | 1/2008 | Park et al. |
| 7,324,310 B2 | 1/2008 | Gill |
| 7,330,339 B2 | 2/2008 | Gill |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,370,404 B2 | 5/2008 | Gill et al. |
| 7,371,152 B1 | 5/2008 | Newman |
| 7,372,665 B1 | 5/2008 | Stoev et al. |
| 7,372,674 B2 | 5/2008 | Gill |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,405,908 B2 | 7/2008 | Gill |
| 7,417,832 B1 | 8/2008 | Erickson et al. |
| 7,419,891 B1 | 9/2008 | Chen et al. |
| 7,420,788 B2 | 9/2008 | Pinarbasi |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,463,459 B2 | 12/2008 | Ding et al. |
| 7,466,524 B2 | 12/2008 | Freitag et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,580,230 B2 | 8/2009 | Freitag et al. |
| 7,583,466 B2 | 9/2009 | Kermiche et al. |
| 7,595,967 B1 | 9/2009 | Moon et al. |
| 7,602,589 B2 | 10/2009 | Freitag et al. |
| 7,639,457 B1 | 12/2009 | Chen et al. |
| 7,652,856 B2 | 1/2010 | Pinarbasi |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,697,242 B2 | 4/2010 | Gill |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,916,435 B1 | 3/2011 | Gill |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,068,317 B2 | 11/2011 | Gill |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |

(56) References Cited

U.S. PATENT DOCUMENTS

| | | |
|---|---|---|
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,514,525 B2 | 8/2013 | Childress et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |

(56) References Cited

U.S. PATENT DOCUMENTS

| | | |
|---|---|---|
| 8,813,324 B2 | 8/2014 | Emley et al. |
| 2002/0131215 A1* | 9/2002 | Beach .................... B82Y 10/00 360/324.2 |
| 2004/0166368 A1 | 8/2004 | Gill et al. |
| 2006/0285259 A1 | 12/2006 | Gill et al. |
| 2008/0180863 A1 | 7/2008 | Gill |
| 2009/0316308 A1 | 12/2009 | Saito et al. |
| 2010/0290157 A1 | 11/2010 | Zhang et al. |
| 2011/0069417 A1* | 3/2011 | Kawamori ............. B82Y 10/00 360/319 |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2012/0327537 A1* | 12/2012 | Singleton ............. G11B 5/3912 360/244 |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |
| 2014/0293474 A1* | 10/2014 | Yamane ................ G11B 5/3932 360/75 |
| 2015/0098155 A1* | 4/2015 | Lapicki ................ G01R 33/093 360/319 |
| 2015/0109702 A1* | 4/2015 | Li ........................ G11B 5/3912 360/99.08 |
| 2015/0170686 A1* | 6/2015 | Singleton ............. G11B 5/3912 360/319 |
| 2015/0318004 A1* | 11/2015 | Singleton ................ G11B 5/115 156/60 |
| 2015/0325260 A1* | 11/2015 | Singleton ............. G11B 5/3932 360/319 |
| 2015/0332713 A1* | 11/2015 | Du ........................ G11B 5/3912 360/319 |
| 2016/0035378 A1* | 2/2016 | Quan .................... G11B 5/127 428/811.2 |
| 2016/0351212 A1* | 12/2016 | Okawa ................. G11B 5/3912 |

* cited by examiner

ABS View

ABS Plan View

Apex View

ABS Plan View

ABS View

FREE LAYER MAGNETIC READER THAT MAY HAVE A REDUCED SHIELD-TO-SHIELD SPACING

BACKGROUND

FIG. 1 depicts an air-bearing surface (ABS) view of a conventional read transducer used in magnetic recording technology applications. The conventional read transducer 10 includes shields 12 and 18, insulator 14, magnetic bias structures 16, and sensor 20. The read sensor 20 is typically a giant magnetoresistive (GMR) sensor or tunneling magnetoresistive (TMR) sensor. The read sensor 20 includes an antiferromagnetic (AFM) layer 22, a pinned layer 24, a nonmagnetic spacer layer 26, and a free layer 28. Also shown is a capping layer 30. In addition, seed layer(s) may be used. The free layer 28 has a magnetization sensitive to an external magnetic field. Thus, the free layer 28 functions as a sensor layer for the magnetoresistive sensor 20. If the sensor 20 is to be used in a current perpendicular to plane (CPP) configuration, then current is driven in a direction substantially perpendicular to the plane of the layers 22, 24, 26, and 28. Conversely, in a current-in-plane (CIP) configuration, then conductive leads (not shown) would be provided on the magnetic bias structures 16. The magnetic bias structures 16 are used to magnetically bias the free layer 28.

Although the conventional transducer 10 functions, there are drawbacks. The trend in magnetic recording is to higher density memories. For higher linear densities, the shield-to-shield spacing, SS, and the track width are both desired to be reduced. The conventional shield-to-shield spacing for the transducer is on the order of twenty-two nanometers or more. The conventional read sensor 20 may not adequately read high linear density media. Accordingly, what is needed is a system and method for improving the performance of a magnetic recording read transducer at higher linear densities.

DETAILED DESCRIPTION OF THE PREFERRED EMBODIMENTS

Figure 1:
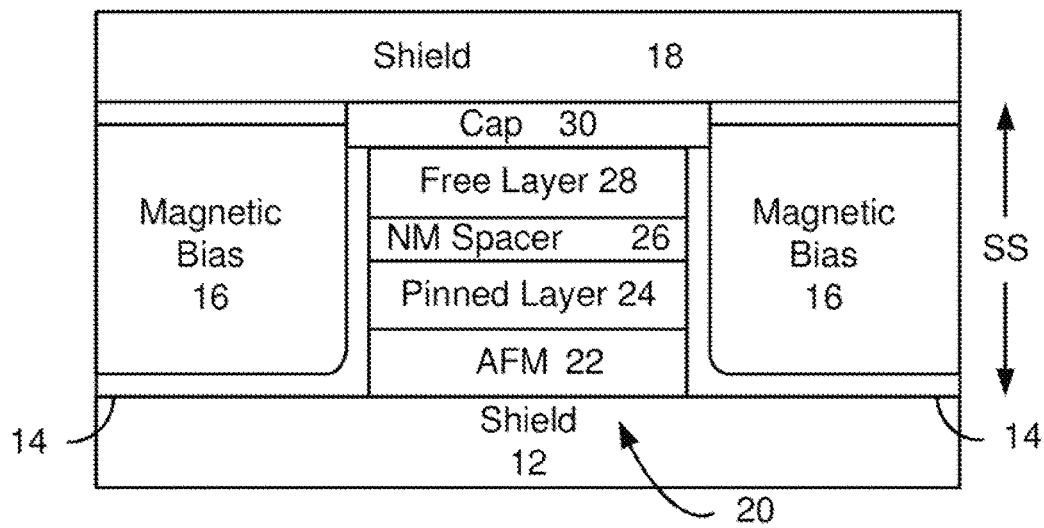
FIG. 1 depicts an ABS view of a conventional magnetic recording read transducer.
Figure 2A:
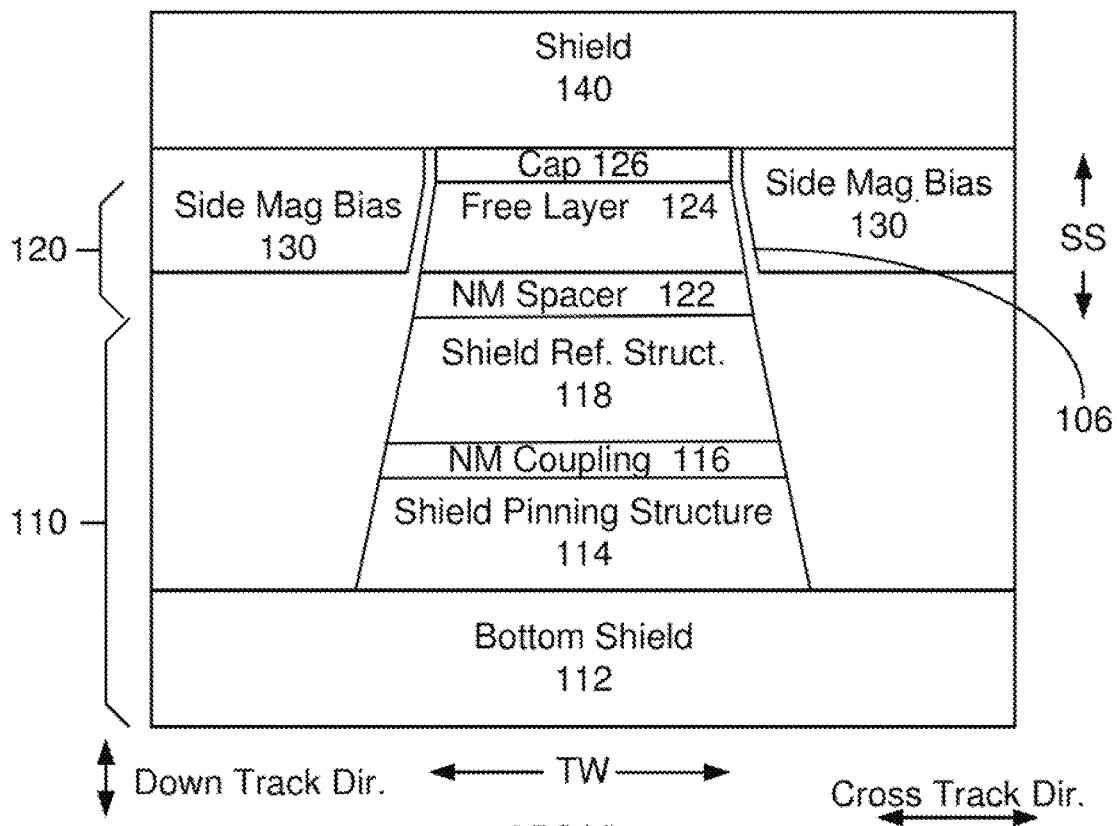
FIGS. 2A-2C depicts ABS, plan and apex views of an exemplary embodiment of a portion of a magnetic read transducer.
Figure 2B:
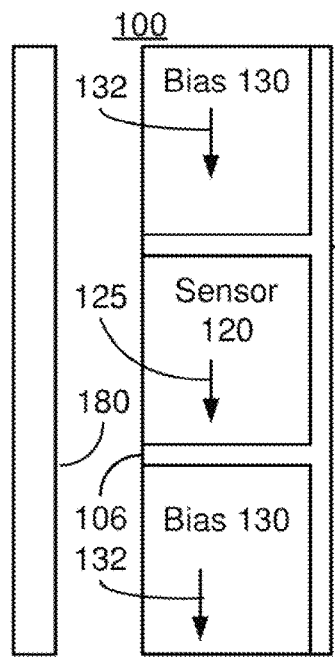
Figure 2C:
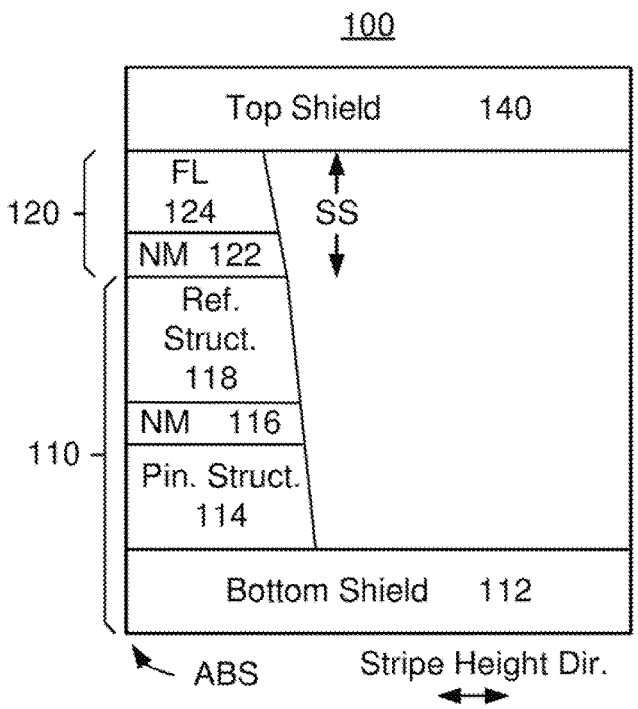

FIGS. 2A-2C depict ABS, plan and side views of an exemplary embodiment of a portion of a magnetic read transducer 100. For clarity, FIGS. 2A-2C are not to scale. FIG. 2B also depicts the media 180 which may be used with the transducer 100. The read transducer 100 may be part of a read head or may be part of a merged head that also includes a write transducer. The head of which the read transducer 100 is a part is contained in a disk drive having a media 180, a slider and the head coupled with the slider. Further, only a portion of the components of the read transducer 100 are depicted.

The transducer 100 includes top shield 140, insulator 106, shield structure 110, read sensor 120, and side magnetic bias structures 130 that may be separated from the read sensor 120 by an insulating layer 106. The read sensor 120 includes a nonmagnetic spacer 122 and a free layer 124. The nonmagnetic spacer layer 122 may be conductive or an insulating tunneling barrier layer, such as MgO. The free layer 124 is ferromagnetic and may include multiple layers. Thus, the only magnetic layer(s) for the read sensor 120 may be (or be within) the free layer 124. The sensor 120 may thus be termed a "free layer only" read sensor 120. The difference in orientation between the magnetic moment(s) 125 of the free layer 124 and the magnetic moment of a top ferromagnetic layer of the shield reference structure 118 gives rise to a magnetoresistance. The read sensor 120 is, therefore, a giant magnetoresistive (GMR) or tunneling magnetoresistive (TMR) read sensor in the embodiment shown. The resistance of the read sensor 120 may be used to read data. The read sensor 120 may also be configured for high density recording. Thus, in some embodiments, the track width (TW) of the read sensor 120 may be small. For example, the track width may be not more than thirty nanometers.

The side magnetic bias structures 130 may take various forms. In some embodiments, both the magnetic bias structures 130 are soft magnetic layers. For example, the magnetic bias structures 130 may be an alloy, multilayer or other structure that has soft magnetic properties. For example, the magnetic bias structures 130 may include CoFe and/or NiFe. In other embodiments, the magnetic bias structures 130 may be hard bias structures. For example, the magnetic bias structures 130 may be an alloy or multilayer that has a sufficiently high coercivity to have its magnetic moment substantially unchanged during operation of the transducer 100. In other embodiments, the magnetic bias structure 130 have another structure. The magnetic moments 132 of the magnetic bias structures 130 are shown parallel to the cross track direction. The magnetic moments 132 magnetically bias the sensor magnetic moment 125 in the cross track direction.

The shield structure 110 may include an optional bottom shield 112. The bottom shield 112 may be a soft magnetic alloy, such as NiFe. In other embodiments, the bottom shield 112 may be a multilayer structure including but not limited to an antiferromagnetically coupled (AFC) shield. The shield structure 110 also includes a shield pinning structure 114 and a shield reference structure 118. The nonmagnetic spacer layer 122 is between the shield reference structure 118 and the free layer 124. The shield pinning structure 114 may be separated from the shield reference structure 118 by a nonmagnetic coupling layer 116. The nonmagnetic coupling layer 116 mediates the magnetic coupling between the shield reference structure 118 and the shield pinning structure 114. Thus, a magnetic moment of the shield reference structure 116 is weakly magnetically coupled with a magnetic moment of the shield pinning structure 114. The shield pinning structure 114 may be magnetically coupled with the bottom shield 112.

The shield pinning structure 114 may have its magnetic moment(s) strongly pinned, or fixed, in place. For example, the shield pinning structure 114 may include an antiferromagnetic (AFM) layer and a ferromagnetic layer exchanged coupled to the AFM layer. This exchange coupling is generally relatively strong. The magnetic moment(s) of the shield pinning structure 114 may not be responsive to an external field, for example a field due to a media 180. In contrast, the bottom shield 112 has magnetic moment(s) that do respond to an external magnetic field.

The shield reference structure 118 includes at least one ferromagnetic layer. In some embodiments, the shield reference structure 118 includes multiple ferromagnetic layers interleaved with and sandwiching nonmagnetic layers. In other embodiments, a single ferromagnetic layer might be used. Other configurations are possible. In some embodiments, the thickness(es) of the ferromagnetic layers are at least two nanometers and not more than ten nanometers. However, the ferromagnetic layer closest to the shield pining structure 114 may be thicker. For example, this ferromagnetic layer may have a thickness of at least three nanometers and not more than twenty nanometers. The thickness(es) of the nonmagnetic layer(s) within the shield reference structure 118 may be selected that the ferromagnetic layers are antiferromagnetically coupled via a Ruderman-Kasuya-Kittel-Yosida (RKKY) interaction.

The shield reference structure 118 may act as a reference layer for the magnetoresistance of the read sensor 120 and act as a shield. This is because the magnetic moment(s) of the shield reference structure 118 may be considered to be partially pinned and partially free. The magnetic moments of the ferromagnetic layers within the shield reference structure 118 may be strongly coupled to each other. In some embodiments, the ferromagnetic layers are antiferromagnetically coupled with a characteristic magnetic field strength of at least eight hundred and not more than two thousand Oe. The magnetic coupling between the shield reference structure 118 and the shield pinning structure 114 is less than the magnetic coupling between the layers within the shield reference structure 118. For example, the shield reference structure 118 may be coupled with the shield pinning structure 114 with a characteristic field strength of at least three hundred Oe and not more than one thousand five hundred Oe. Thus, the magnetic moments of the shield reference layer 118 are not completely pinned. For example, the shield reference structure 118 has a permeability of at least five and not more than eight hundred. The magnetic moments of the shield reference structure 118 may be at least somewhat responsive to an external magnetic field. However, the magnetic moment(s) of the shield reference structure 118 are sufficiently fixed that a GMR or TMR may be developed between the free layer 124 and the shield reference structure 118.

The magnetic transducer 100 may be suitable for use at higher linear densities. The magnetic moment(s) of the shield reference structure 118 are partially fixed, while the magnetic moment(s) of the free layer 124 respond to the magnetic field of a bit in the media 180 being read. A characteristic magnetoresistance may be developed for the sensor 120 depending upon the direction of the field due to the bit being read and, therefore, information stored in the bit. Thus, the magnetic transducer 100 is capable of reading data using a single free layer sensor 120. Because the magnetic moment(s) of the shield reference structure 118 may at least partially respond to an external field, the shield reference structure 118 may at least partially shield the free layer 124 from the magnetic field of bits not being read. Stated differently, the shield reference structure 118 is part of the shield structure 110. Thus, the spacing between the shields 110 and 140, SS, may be reduced to the thickness of the free layer 124, nonmagnetic spacer layer 122 and capping layer 126. The shield-to-shield spacing may be less than fifteen nanometers. In some embodiments, the shield-to-shield spacing may be on the order of ten nanometers or less. Thus, the shield-to-shield spacing of the magnetic transducer 100 may be reduced. Consequently, the magnetic transducer 100 may be suitable for high linear and/or areal density magnetic recording applications.

Figure 3:
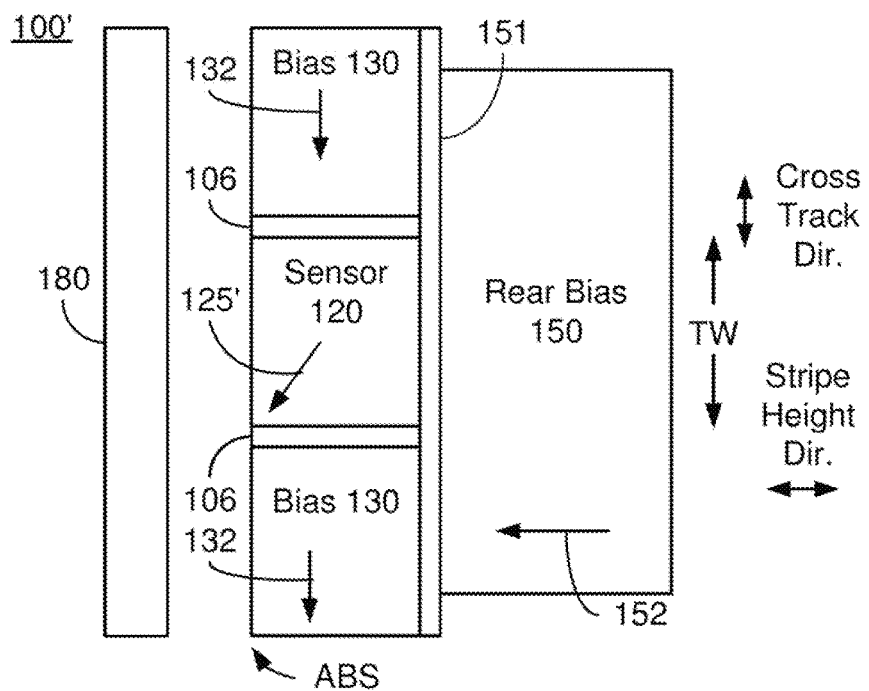
FIG. 3 depicts an ABS view of another exemplary embodiment of a portion of a dual free layer magnetic read transducer.

FIG. 3 depicts a plan view of another embodiment of a magnetic read transducer 100'. For clarity, FIG. 3 is not to scale. The read transducer 100' may be part of a read head or may be part of a merged head that also includes a write transducer. The head of which the read transducer 100' is a part is part of a disk drive having a media 180, a slider and the head coupled with the slider. The transducer 100' corresponds to the transducer 100. Consequently, analogous components are labeled similarly. For example, the transducer 100' includes a read sensor 120 including a free layer and a nonmagnetic spacer layer analogous to the layers 124 and 122. The magnetic transducer 100 also includes side bias structures 130 having magnetic moments 132, insulator 106, shield structure (not shown) and shield (not shown) that are analogous to the structures 130, 132, 106, 110 and 140 depicted in FIGS. 2A-2C.

In addition, the magnetic transducer 100' includes a rear bias structure 150 that may be separated from the read sensor 120 and side bias structure 130 by a nonmagnetic insulator 151. The read sensor 120 is between the ABS and the rear magnetic bias structure 150. The rear bias structure 150 is shown having a width in the cross-track direction that is greater than the track width. In other embodiments, the rear bias structure 150 may have a width that is substantially equal to the track width, TW, of the read sensor 120. In some embodiments, this is because the sensor 120 and rear bias structure 150 are defined in the cross-track direction using a single mask. Stated differently, the rear bias structure 160 and sensor 110 may be self-aligned. In other embodiments, the rear bias structure 150 may extend to or past the outside edges of the bias structures 130 in the cross-track direction. In some embodiments, the length of the rear bias structure 150 in the stripe height direction is greater than the width in the cross-track direction. Thus, the rear bias structure 150 may have a shape anisotropy that is perpendicular to the ABS. The rear bias structure 150 may include magnetically soft and/or magnetically hard materials.

The rear magnetic bias structure 150 magnetically biases the read sensor 120 in a stripe height direction perpendicular to the ABS. The magnetic moment 152 of the rear bias structure 150 is thus shown as oriented toward the ABS. In other embodiments, the magnetic moment 152 may be oriented in the opposite direction. Because of the combination of the side bias structures 130 and the rear bias structure 150, the magnetic moment 125' of the read sensor 120 is canted from the cross-track direction in the absence of an external field.

The magnetic transducer 100' may be suitable for use at higher linear densities. The magnetic moment(s) of the shield reference structure (not shown in FIG. 3) are partially fixed, while the magnetic moment 125' of the free layer/sensor 120 responds to the magnetic field of a bit in the media 180 being read. A characteristic magnetoresistance may be developed for the sensor 120 depending upon the direction of the field due to the bit being read. Thus, the magnetic transducer 100' is capable of reading data using a single free layer sensor 120. Because the magnetic moment(s) of the shield reference structure may at least partially respond to an external field, the shield reference structure may at least partially shield the free layer/sensor 120 from the magnetic field of bits not being read. Stated differently, the shield reference structure is part of the shield structure. The spacing between the shields may be reduced to the thickness of the free layer, nonmagnetic spacer layer and capping layer. The shield-to-shield spacing may be less than fifteen nanometers. In some embodiments, the shield-to-shield spacing may be on the order of ten nanometers or less. Thus, the shield-to-shield spacing of the magnetic transducer 100' may be reduced. Consequently, the magnetic transducer 100' may be suitable for high linear and/or areal density magnetic recording applications.

Figure 4A:
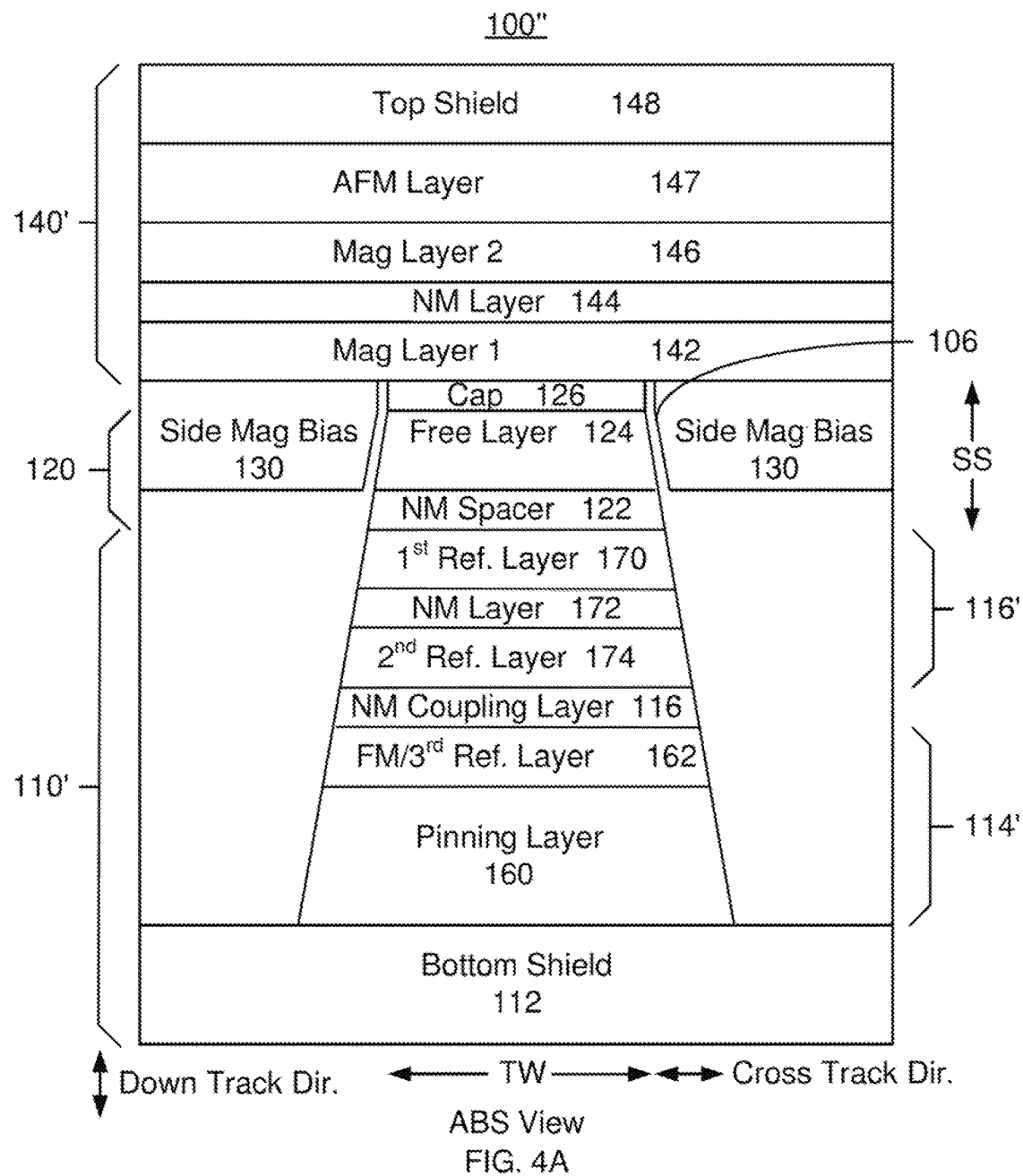
FIGS. 4A-4D depict ABS views of another exemplary embodiment of a portion of a magnetic read transducer.
Figure 4B:
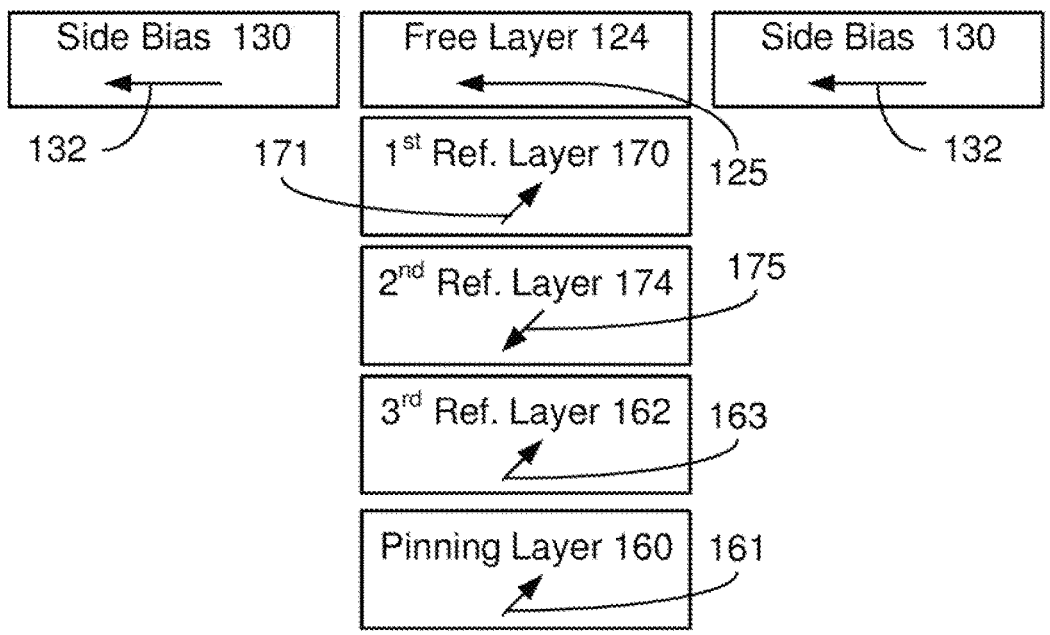
Figure 4C:
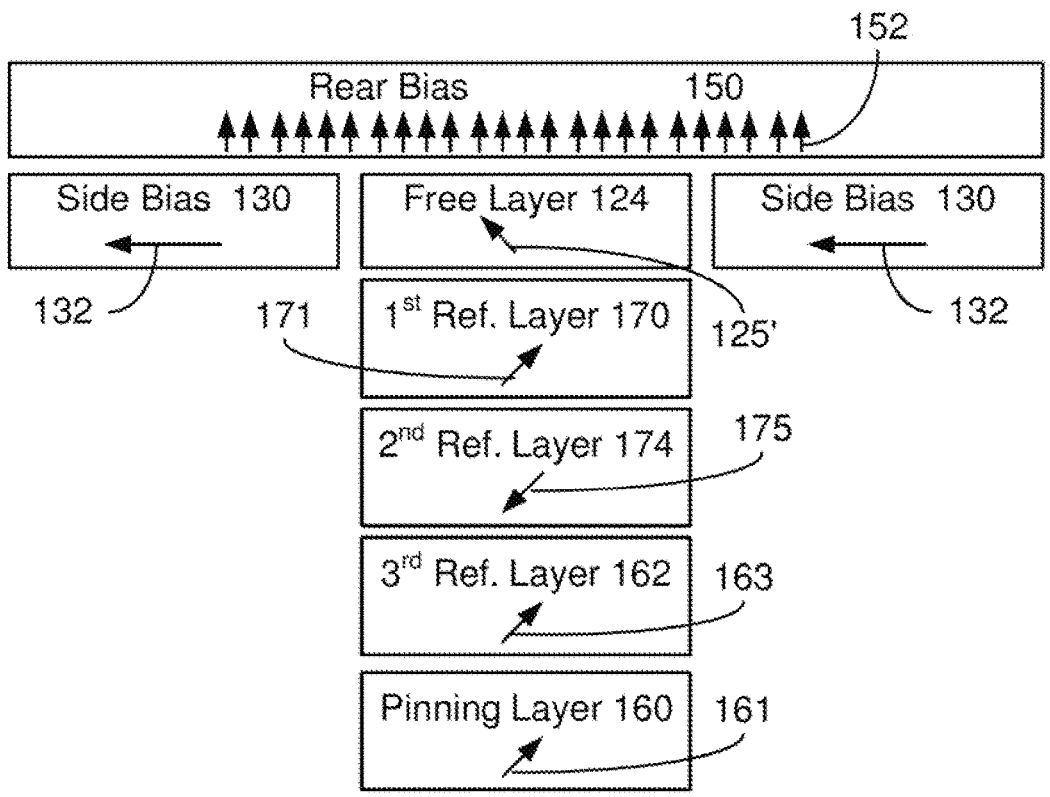
Figure 4D:
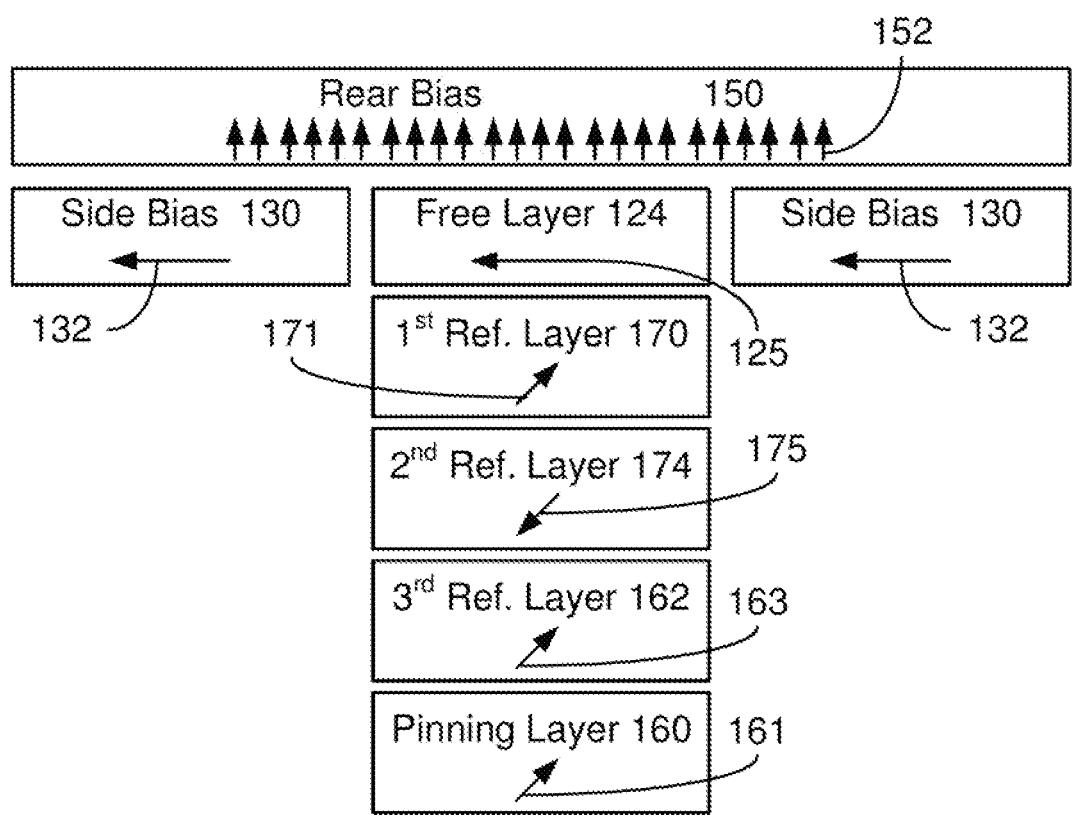

FIGS. 4A-4D depict various views of exemplary embodiments of a portion of a magnetic read transducer 100". For clarity, FIGS. 4A-4D are not to scale. FIG. 4A depicts an ABS view of the magnetic transducer 100". FIGS. 4B-4D depict embodiments of the magnetic transducer 100" in the absence of an external field. FIG. 4B depicts the magnetic layers of the transducer 100" if no rear magnetic bias is used. FIG. 4C depicts the magnetic layers of the transducer 100" in the presence of a rear magnetic bias. FIG. 4D depicts another embodiment of the magnetic layers of the transducer 100" if a different magnetic bias is used. The read transducer 100" may be part of a read head or may be part of a merged head that also includes a write transducer. The head of which the read transducer 100" is a part is contained in a disk drive having a media (not shown in FIGS. 4A-4D), a slider and the head coupled with the slider. Further, only a portion of the components of the read transducer 100" are depicted.

The transducer 100" corresponds to the transducer(s) 100 and/or 100'. Consequently, analogous components are labeled similarly. For example, the transducer 100" includes a read sensor 120 including a free layer 124 and a nonmagnetic spacer layer 122 analogous to the layers 124 and 122. The magnetic transducer 100" also includes side bias structures 130 having magnetic moments 132, insulator 106, shield structure 110' and shield 140' that are analogous to the structures 130, 132, 106, 110 and 140 depicted in FIGS. 2A-2C. Thus, the components 106, 110', 112, 114', 116, 118', 120, 122, 124, 126, 130 and 140' have an analogous structure and function to the corresponding components described above. For example, the sensor 120 is a free layer only sensor including the free layer 124 and nonmagnetic spacer layer 122.

The shield 140' includes a ferromagnetic layer 142, a nonmagnetic layer 144, another ferromagnetic layer 146, an AFM layer 147 and a top shield 148. The magnetic layers 142 and 146 are antiferromagnetically coupled via an RKKY interaction. The ferromagnetic layer 146 is exchange coupled to the AFM layer 147. Thus, the shield 140' is an AFC shield. In other embodiments, the shield 140' may have a different structure.

The shield structure 110' includes a bottom shield 112, a shield pinning structure 114', a nonmagnetic coupling layer 116 and a shield reference structure 118'. The shield pinning structure 114' including a pinning layer 160 and a ferromagnetic layer 162. The pining layer 160 may be an AFM layer, such as IrMn. The magnetic layer 162 has its magnetic moment pinned by the exchange coupling with the pinning layer 160. This can be seen in FIGS. 4B, 4C and 4D. The magnetic moment 163 of the ferromagnetic layer 162 of the shield pinning structure 114' may not be responsive to an external field, for example a field due to a media.

The shield reference structure 118' includes two ferromagnetic layers 170 and 174 interleaved with and sandwiching a nonmagnetic layer 172. The nonmagnetic layer 172 may be a Ru layer. However, other material(s) might be used. The ferromagnetic layers 140 and 174 are termed reference layers because the orientation of the free layer magnetic moment 125/125' with respect to the magnetic moment 171 results in the magnetoresistance of the read sensor 120. In some embodiments, the reference layer 170 is at least two nanometers and not more than ten nanometers thick. The reference layer 174 may have a thickness of at least three nanometers and not more than twenty nanometers. The thickness of the nonmagnetic layer 172 may be selected that the reference layers 170 and 174 are antiferromagnetically coupled via a RKKY interaction. Thus, the coupling between the reference layers 170 and 174 may be relatively strong. In some embodiments, the reference layers 170 and 174 are antiferromagnetically coupled with a characteristic magnetic field strength of at least eight hundred and not more than two thousand Oe. The directions of the magnetic moments 171 and 175 of the reference layers 170 and 174 may be responsive to an external field. For example, the permeability of the shield reference structure 118' may be at least five and not more than eight hundred.

The nonmagnetic coupling layer 116 has a thickness that may be used to set the strength of the coupling between the magnetic layer 162 and the magnetic layer 174. The magnetic coupling between the layers 162 and 174 is less than the magnetic coupling between the reference layers 170 and 174. For example, the magnetic layer 162 may be coupled with the reference layer 174 with a characteristic field strength of at least three hundred Oe and not more than one thousand five hundred Oe. Thus, the magnetic moments 171 and 175 of the shield reference structure 118' are not completely pinned. The magnetic moments 171 and 175 of the reference layers 172 and 174 are strongly coupled. However, the reference layer 174 is not strongly magnetically coupled to the layer 162. Thus, the magnetic moments 171 and 175 of the reference layers 170 and 174, respectively, may be at least partially responsive to an external field. Thus, the reference layers 170 and 174 are part of the shield.

Although described as separate structures, the structures 114', 116 and 118' may be considered to form an antiferromagnetically coupled shield structure. Thus, the ferromagnetic layer 162 of the pinning structure 114' may be considered to be a third reference layer for the shield structure 110'. In such a shield structure 110', the third reference layer 162 is strongly coupled to the pinning layer 160. However, the second reference layer 174 is weakly coupled with the third reference layer 162.

FIG. 4B depicts one embodiment of the magnetic layers of the transducer 100" in the absence of a rear bias structure. The free layer 124 has a magnetic moment 125 that is magnetically biased by the moments 132 of the side bias structures 130. Thus, the free layer magnetic moment 125 is in the cross-track direction. As can also be seen in FIG. 4B, the magnetic moment 163 of the ferromagnetic layer 162 is coupled to the direction of orientation some of the magnetic moments 161 of the pinning layer 160. The magnetic moments 171 and 175 of the layers 170 and 174 are antiferromagnetically coupled. The moment 175 of the layers 174 is weakly coupled with the moment 163 of the layer 162.

FIG. 4C depicts one embodiment of the magnetic layers of the transducer 100" in the presence of a rear bias structure 150 having magnetic moments 152. The free layer 124 has a magnetic moment 125' that is magnetically biased by the moments 132 of the side bias structures 130 and by the magnetic moment 152 of the rear bias structure 150. In the embodiment shown, the magnetic bias due to the rear bias structure 150 is sufficiently strong that the magnetic moment 125' is canted from the cross-track direction. As can also be seen in FIG. 4C, the magnetic moment 163 of the ferromagnetic layer 162 is coupled to the direction of orientation some of the magnetic moments 161 of the pinning layer 160. The magnetic moments 171 and 175 of the layers 170 and 174 are antiferromagnetically coupled. The moment 175 of the layers 174 is weakly coupled with the moment 163 of the layer 162.

FIG. 4D depicts another embodiment of the magnetic layers of the transducer 100" in the presence of a rear bias structure 150 having magnetic moments 152. The free layer 124 has a magnetic moment 125 that is magnetically biased by the moments 132 of the side bias structures 130 and by the magnetic moment 152 of the rear bias structure 150. In the embodiment shown, the magnetic bias due to the rear bias structure 150 is sufficiently weak that the magnetic moment 125 remains in the cross-track direction. As can also be seen in FIG. 4D, the magnetic moment 163 of the ferromagnetic layer 162 is coupled to the direction of orientation of the magnetic moments 161 of the pinning layer 160. The magnetic moments 171 and 175 of the layers 170 and 174 are antiferromagnetically coupled. The moment 175 of the layers 174 is weakly coupled with the moment 163 of the layer 162.

The magnetic transducer 100" may be suitable for use at higher linear densities. The magnetic moments 171 and 175 of the shield reference structure 118' are partially fixed. The magnetic moment 125/125' of the free layer 124 responds to the magnetic field of a bit in the media being read. Thus, a magnetoresistance may be developed for the sensor 120 depending upon the information stored in the bit. Thus, the magnetic transducer 100" is capable of reading data using a single free layer sensor 120. Because the magnetic moment 171 and 175 of the shield reference structure 118' may at least partially respond to an external field, the shield reference structure 118' may at least partially shield the free layer 124 from the magnetic field of bits not being read. The spacing between the shields 110' and 140', SS, may be reduced to the thickness of the free layer 124, nonmagnetic spacer layer 122 and capping layer 126. The shield-to-shield spacing may be less than fifteen nanometers. In some embodiments, the shield-to-shield spacing may be on the order of ten nanometers or less. Thus, the shield-to-shield spacing of the magnetic transducer 100" may be reduced. Consequently, the magnetic transducer 100" may be suitable for high linear and/or density magnetic recording applications.

Figure 5A:
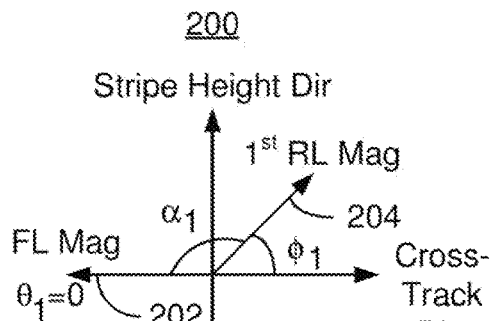
FIGS. 5A-5C depict an exemplary embodiment of the magnetic moments of the magnetic read transducer without and with an external magnetic field.
Figure 5B:
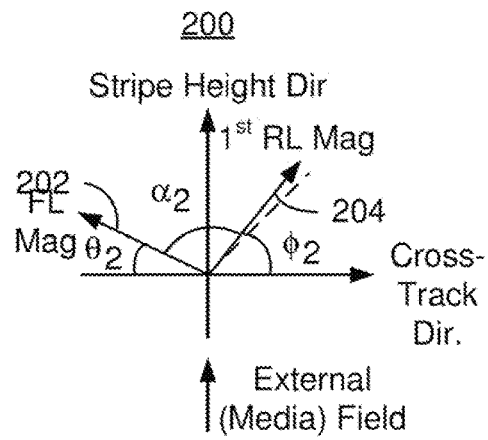
Figure 5C:
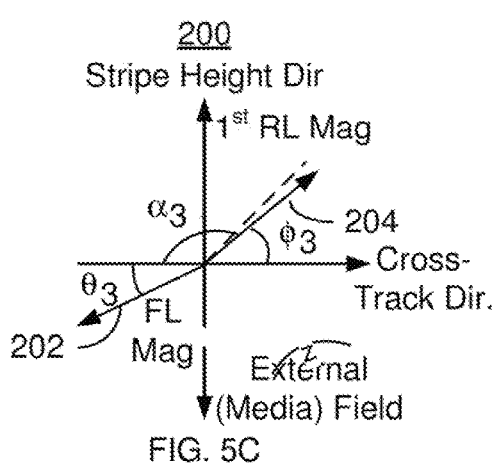

Operation of the magnetic transducers 100, 100' and/or 100" may be understood with respect to FIGS. 5A-5C and FIGS. 6A-6C. FIGS. 5A, 5B and 5C are charts 200 depicting the magnetic moments of the free layer 120 and the first reference layer 170 with no external field, with an external field in one direction and with an external field in the opposite direction. Thus, FIGS. 5B and 5C may be viewed as depicting the influence of bits storing a logical "0" and a logical "1", respectively, or vice versa. FIGS. 5A-5C correspond to a transducer 100/100'/100" which either does not have a rear bias 150 or for which the rear bias is sufficiently weak that the free layer magnetic moment 202 is not canted from the cross-track direction when no external field is applied. In other words, FIGS. 5A-5C may be viewed as representing the situations shown in FIG. 4B or FIG. 4D. In FIGS. 5A, 5B and 5C, the free layer magnetic moment is denoted by reference numeral 202, while the first reference layer 170 magnetic moment is denoted by the reference numeral 204.

In FIG. 5A, the free layer magnetic moment 202 is in the cross-track direction. Thus, the angle at which the free layer is canted from the cross-track direction, $\theta_1$, is zero. The first reference layer magnetic moment 204 is at an angle $\phi_1$, from the cross track direction. In some embodiments, $\phi_1$ is at least forty degrees and not more than fifty degrees. The first reference layer magnetic moment 204 may thus be directed at a nonzero angle from the ABS. Thus, the free layer magnetic moment 202 is at an angle $\alpha_1$ from the first reference layer magnetic moment 204 when no external field is applied.

FIG. 5B depicts the situation when the external field is in the stripe height direction (towards the ABS). Both the free layer magnetic moment 202 and the first reference layer magnetic moment 204 have responded to the external field. Thus, the free layer magnetic moment 202 is at a new angle, $\theta_2$ from the cross track direction. Similarly, the reference layer magnetic moment is at angle $\phi_2$ from the cross-track direction. In FIG. 5B, the dashed line denotes the orientation of the reference layer magnetic moment 204 without the external field. Thus, the free layer magnetic moment 202 may be seen as more free to change in response to the external magnetic field. The free layer magnetic moment 202 and the first reference layer magnetic moment 204 are at a new angle, $\alpha_2$, which is smaller than $\alpha_1$. Therefore, the magnetoresistance of the read sensor 120 is different for the configuration shown in FIG. 5B than for the configuration shown in FIG. 5A.

FIG. 5C depicts the situation when the external magnetic field is in the opposite direction to that shown in FIG. 5B. Thus, the free layer magnetic moment 202 forms the angle $\theta_3$ with respect to the cross track direction. The free layer magnetic moment 202 has again changed orientation due to the external field. Similarly, the first reference layer magnetic moment 204 has slightly changed orientation due to the external field. Thus, the magnetic moments 202 and 204 form angles $\theta_3$ and $\phi_3$, respectively, with the cross track direction. The dashed line in FIG. 5C indicates the orientation of the first reference layer magnetic moment 204 in the absence of an external field. The free layer magnetic moment 202 and the first reference layer magnetic moment 204 form a new angle, $\alpha_3$. This angle is different from $\alpha_1$ and from $\alpha_2$. Because the magnetoresistance of the sensor 120 depends upon the angle between the free layer magnetic moment 202 and the reference layer magnetic moment 204, the sensor 120 has different magnetoresistances depending on the external field from the media. Thus, the magnetic transducer 100, 100' and/or 100" may read data from the media. In addition, because the first reference layer magnetic moment 204 changes direction based on the applied field, the first reference layer 170 is part of the shield 110/110'. Consequently, the shield-to-shield spacing may be reduced. The benefits of the magnetic transducers 100, 100' and/or 100" discussed above may, therefore, be achieved.

Figure 6A:
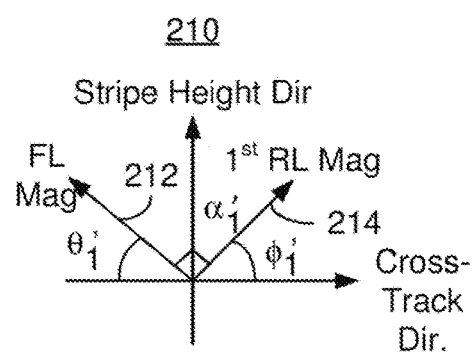
FIGS. 6A-6C depict another exemplary embedment the magnetic moments of the magnetic read transducer without and with an external magnetic field.
Figure 6B:
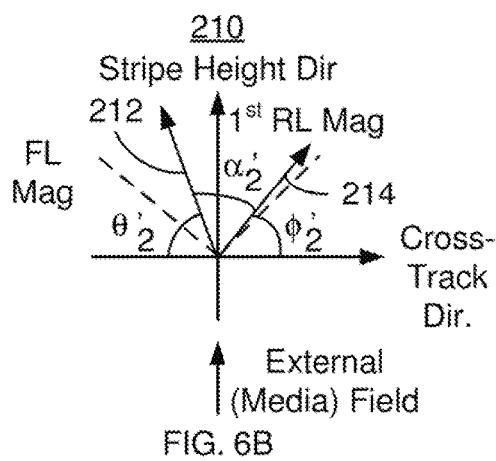
Figure 6C:
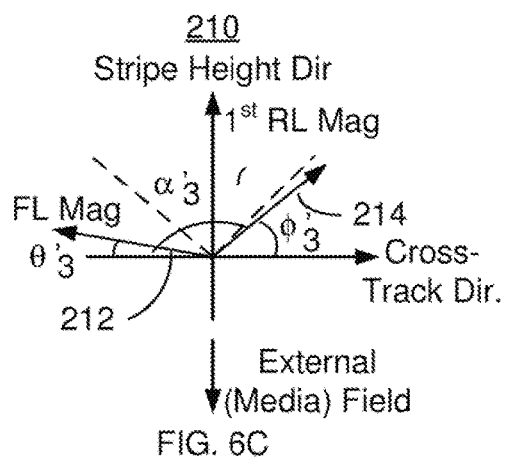

FIGS. 6A, 6B and 6C are charts 210 depicting the magnetic moments of the free layer 120 and the first reference layer 170 with no external field, with an external field in one direction and with an external field in the opposite direction. Thus, FIGS. 6B and 6C may be viewed as depicting the influence of bits storing a logical "0" and a logical "1", respectively, or vice versa. FIGS. 6A-6C correspond to a transducer 100/100'/100" which has a rear bias 150 that is sufficiently strong that the free layer magnetic moment 202 is canted from the cross-track direction when no external field is applied. In other words, FIGS. 6A-6C may be viewed as representing the situations shown in FIG. 4C. In FIGS. 6A, 6B and 6C, the magnetic moment of the free layer 124 is denoted by reference numeral 212, while the magnetic moment of the first reference layer 170 is denoted by the reference numeral 214.

In FIG. 6A, the free layer magnetic moment 212 is canted from the cross-track direction by an angle, $\theta_1'$. The first reference layer magnetic moment 214 is at an angle $\phi_1'$, from the cross track direction. In some embodiments, $\phi_1'$ is at least forty degrees and not more than fifty degrees. The first reference layer magnetic moment 214 may thus be directed at an angle from the ABS. Thus, the free layer magnetic moment 212 is at an angle $\alpha_1'$ from the first reference layer magnetic moment 214 when no external field is applied. In the embodiment shown, $\alpha_1'$ is ninety degrees. However, other values are possible.

FIG. 6B depicts the situation when the external field is in the stripe height direction (towards the ABS). Both the free layer magnetic moment 212 and the first reference layer magnetic moment 214 have responded to the external field. Thus, the free layer magnetic moment 212 is at a new angle, $\theta_2'$ from the cross track direction. Similarly, the reference layer magnetic moment is at angle $\phi_2'$ from the cross-track direction. In FIG. 6B, the dashed line denotes the orientation of the magnetic moment 214 without the external field. Thus, the free layer magnetic moment 212 may be seen as more free to change in response to the external magnetic field. The free layer magnetic moment 212 and the first reference layer magnetic moment 214 are at a new angle, $\alpha_2'$ which is smaller than $\alpha_1'$.

FIG. 6C depicts the situation when the external magnetic field is in the opposite direction to that shown in FIG. 6B. Thus, the free layer magnetic moment 212 forms the angle $\theta_3'$ with respect to the cross-track direction. The free layer magnetic moment 212 has again changed orientation due to the external field. Similarly, the first reference layer magnetic moment 201 has slightly changed orientation due to the external field. Thus, the magnetic moments 212 and 214 form angles $\theta_3'$ and $\phi_3'$, respectively, with the cross-track direction. The dashed line in FIG. 6C indicates the orientation of the first reference layer magnetic moment 214 in the absence of an external field. The free layer magnetic moment 212 and the first reference layer magnetic moment 214 form a new angle, $\alpha_3'$. This angle is different from $\alpha_1'$ and from $\alpha_2'$. Because the magnetoresistance of the sensor 120 depends upon the angle between the free layer magnetic moment 212 and the reference layer magnetic moment 214, the sensor 120 has different magnetoresistances depending on the external field from the media. Thus, the magnetic transducer 100, 100' and/or 100" may read data from the media. In addition, because the first reference layer magnetic moment 214 changes based on the applied field, the first reference layer 170 is part of the shield 110/110'. Consequently, the shield-to-shield spacing may be reduced. The benefits of the magnetic transducers 100, 100' and/or 100" discussed above may, therefore, be achieved.

Figure 7:
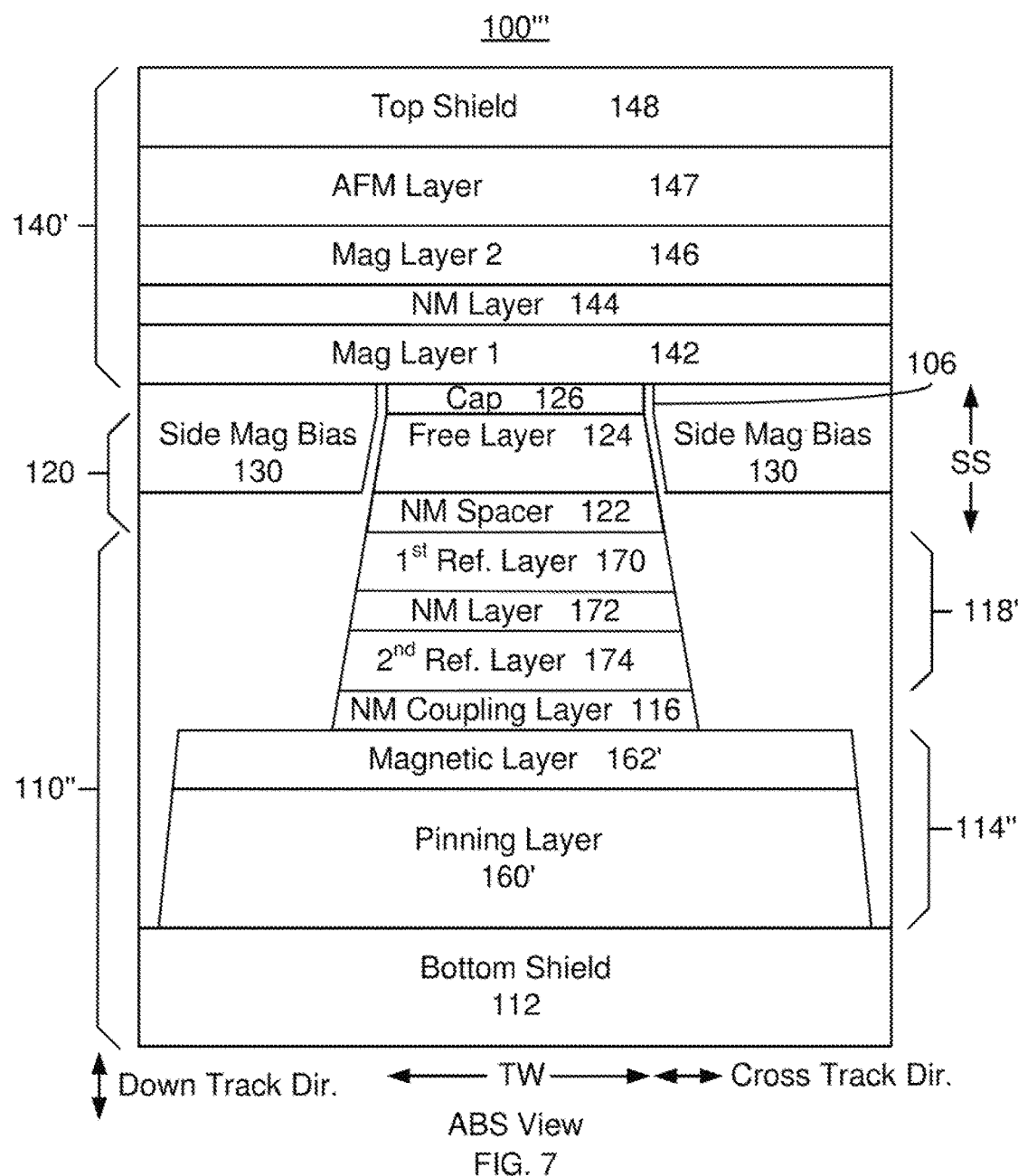
FIG. 7 depicts an ABS view of another exemplary embodiment of a portion of a magnetic read transducer.

FIG. 7 depicts an ABS view of exemplary embodiments of a portion of another magnetic read transducer 100'''. For clarity, FIG. 7 is not to scale. The read transducer 100''' may be part of a read head or may be part of a merged head that also includes a write transducer. The head of which the read transducer 100''' is a part is contained in a disk drive having a media (not shown in FIG. 7), a slider and the head coupled with the slider. Further, only a portion of the components of the read transducer 100''' are depicted. Thus, the transducer 100'' may include or may omit a rear bias structure analogous to the rear magnetic bias structure 150.

The transducer 100''' corresponds to the transducer(s) 100, 100' and/or 100''. Consequently, analogous components are labeled similarly. For example, the transducer 100''' includes a read sensor 120 including a free layer 124 and a nonmagnetic spacer layer 122 analogous to the layers 124 and 122. The magnetic transducer 100''' also includes side bias structures 130 having magnetic moments 132, insulator 106 which may be MgO, shield structure 110'' and shield 140' that are analogous to the structures 130, 132, 106, 110/110' and 140/140'. Thus, the components 106, 110'', 112, 114'', 116, 118', 120, 122, 124, 126, 130 and 140' have an analogous structure and function to the corresponding components described above. For example, the sensor 120 is a free layer only sensor including the free layer 124 and nonmagnetic spacer layer 122.

The shield structure 110'' includes a bottom shield 112, a shield pinning structure 114'', a nonmagnetic coupling layer 116 and a shield reference structure 118'. The shield reference structure 118' includes two ferromagnetic layers 170 and 174 interleaved with and sandwiching a nonmagnetic layer 172. The ferromagnetic layers 140 and 174 are termed reference layers because the orientation of the free layer magnetic moment 125/125' with respect to the magnetic moment 171 results in the magnetoresistance of the read sensor 120. The structure and function of the components of the shield reference structure 118' are analogous to those discussed above.

The shield pinning structure 114'' including a pinning layer 160' and a ferromagnetic layer 162'. The structure and function of the pinning layers 160' and ferromagnetic/third reference layer 162' are analogous to those of the layers 160 and 162, respectively. However, in the embodiment shown, the layers 162 and 160' are wider in the cross-track direction. Thus, the widths of the layers 160' and 162' may be defined in a separate step from the layers 170, 172, 174 and 116.

The magnetic transducer 100''' may be suitable for use at higher areal densities. The magnetic moments of the shield reference structure 118' are partially fixed. The magnetic moment of the free layer 124 responds to the magnetic field of a bit in the media being read. Thus, a magnetoresistance may be developed for the sensor 120 depending upon the information stored in the bit. Thus, the magnetic transducer 100''' is capable of reading data using a single free layer sensor 120. Because the magnetic moment of the shield reference structure 118'' may at least partially respond to an external field, the shield reference structure 118'' may at least partially shield the free layer 124 from the magnetic field of bits not being read. The spacing between the shields 110'' and 140', SS, may be reduced to the thickness of the free layer 124, nonmagnetic spacer layer 122 and capping layer 126. The shield-to-shield spacing may be less than fifteen nanometers. In some embodiments, the shield-to-shield spacing may be on the order of ten nanometers or less. Thus, the track width and the shield-to-shield spacing of the magnetic transducer 100'' may be reduced. Consequently, the magnetic transducer 100''' may be suitable for high density magnetic recording applications.

Figure 8:
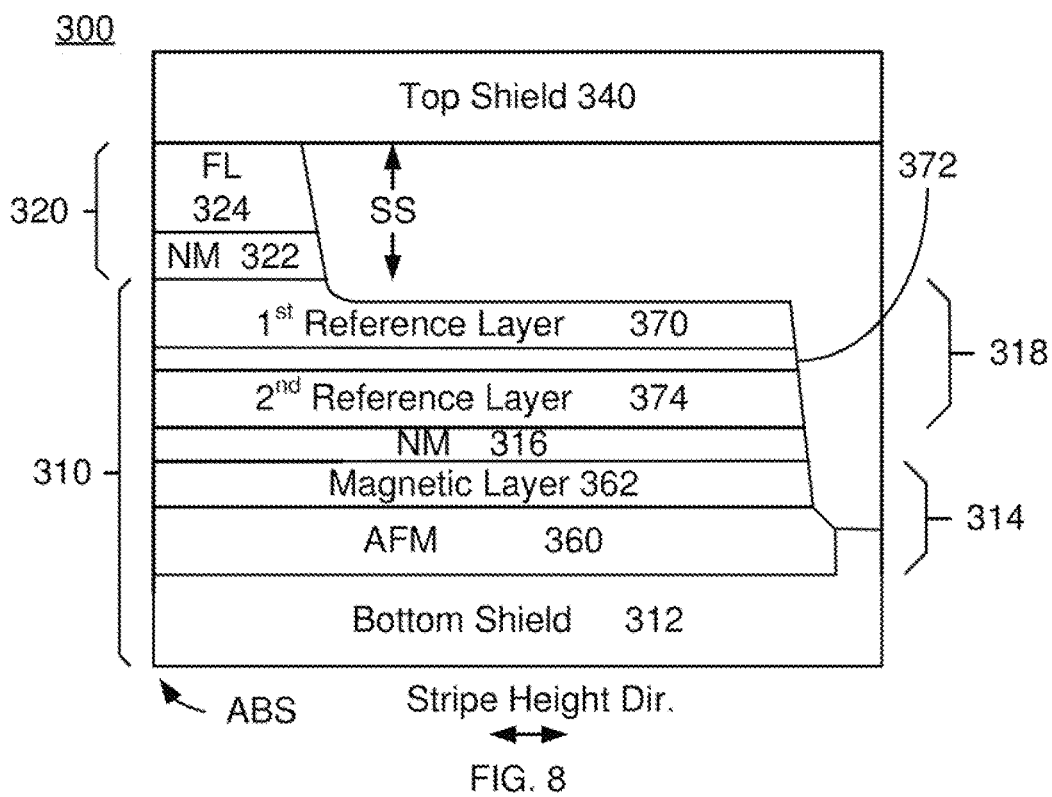
FIG. 8 depicts an apex view of another exemplary embodiment of a portion of a magnetic read transducer.

FIG. 8 depicts an apex view of exemplary embodiments of a portion of another magnetic read transducer 300. For clarity, FIG. 8 is not to scale. The read transducer 300 may be part of a read head or may be part of a merged head that also includes a write transducer. The head of which the read transducer 300 is a part is contained in a disk drive having a media (not shown in FIG. 8), a slider and the head coupled with the slider. Further, only a portion of the components of the read transducer 300 are depicted. Thus, the transducer 300 may include or may omit a rear bias structure analogous to the rear magnetic bias structure 150.

The transducer 300 corresponds to the transducer(s) 100, 100', 100'' and/or 100'''. Consequently, analogous components are labeled similarly. For example, the transducer 300 includes a read sensor 320 including a free layer 324 and a nonmagnetic spacer layer 322 analogous to the layers 124 and 122, respectively. The magnetic transducer 300 includes side bias structures (not shown) and insulator (not shown) analogous to the side bias structures 130 and insulator 106, respectively. Although not shown, the magnetic transducer 300 may also include a capping layer analogous to the capping layer 126. Further, the magnetic read transducer 300 includes a shield structure 310 and shield 340 that are analogous to the structures 110/110'/110'' and 140/140', respectively. Thus, the components 310, 312, 314, 316, 318, 320, 322, 324 and 340 have an analogous structure and function to the corresponding components described above. For example, the sensor 120 is a free layer only sensor including the free layer 124 and nonmagnetic spacer layer 122.

The shield structure 310 includes a bottom shield 312, a shield pinning structure 314, a nonmagnetic coupling layer 316 and a shield reference structure 318 analogous to the structures 112, 114/114'/114'', 116 and 118/118'. Thus, the shield reference structure 318 includes reference layers 370 and 374 separated by nonmagnetic layer 372. The layers 370, 372 and 374 are analogous to the layers 170, 172 and 174, respectively. In the embodiment shown, the shield reference structure. The shield pinning structure 314 includes a pinning layer 360 that may be an AFM layer and magnetic layer 362. The layer 362 may be considered a third reference layer. The layers 360 and 362 are analogous to the layers 160/160' and 162/162', respectively. Thus, the magnetic transducer 300 operates in an analogous manner to the transducer(s) 100, 100', 100'' and/or 100'''.

In addition, the magnetic transducer 300 has an extended length in the stripe height direction. In particular, portions of the reference layers 370, 374 and 362 are longer in the stripe height direction than the free layer 324. In addition, the AFM layer 360 is longer in the stripe height direction. Because of its increased volume, the AFM layer 360 may be more magnetically stable. Pinning of the magnetic layer/third reference layer 362 may be improved. Stability of the reference layers 370 and 374 may also be improved.

The magnetic transducer 300 may share the benefits of the magnetic transducer(s) 100, 100', 100'' and/or 100'''. The spacing between the shields 310 and 340, SS, may be reduced to the thickness of the free layer 324, nonmagnetic spacer layer 322 and capping layer (if present). The shieldto-shield spacing may be less than fifteen nanometers. In some embodiments, the shield-to-shield spacing may be on the order of ten nanometers or less. Thus, the track width and the shield-to-shield spacing of the magnetic transducer 300 may be reduced. Consequently, the magnetic transducer 300 may be suitable for high density magnetic recording applications.

Figure 9:
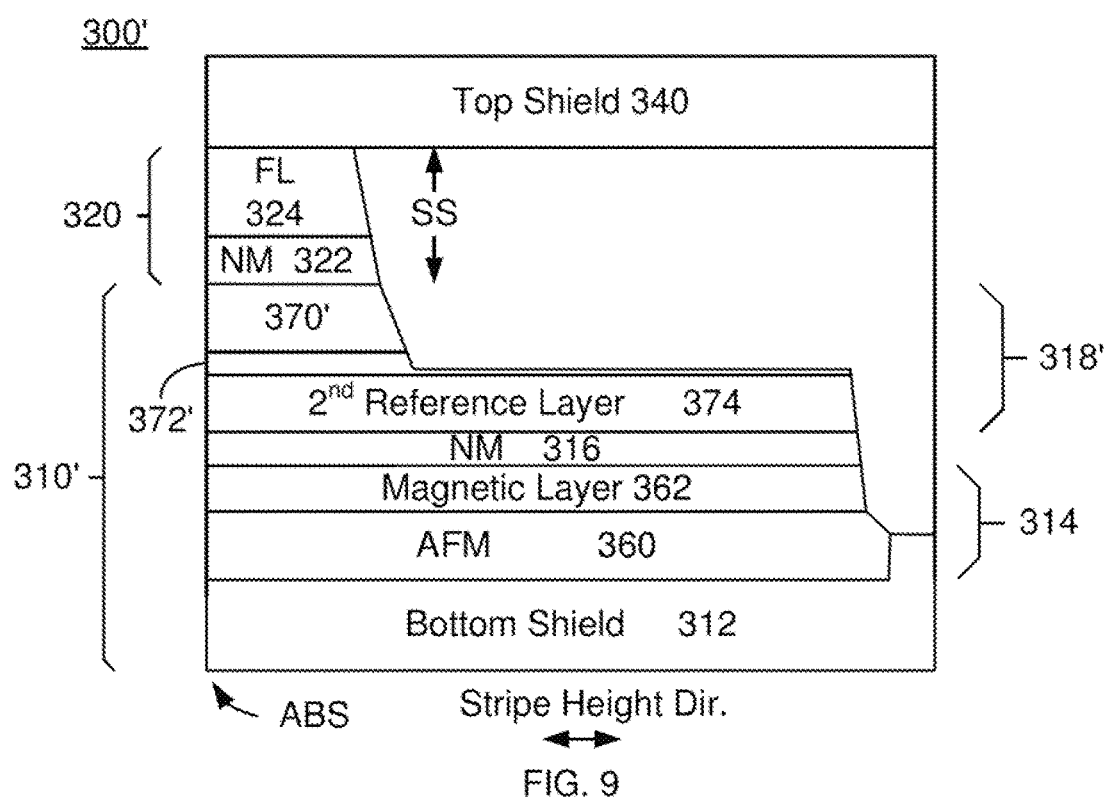
FIG. 9 depicts an apex view of another exemplary embodiment of a portion of a magnetic read transducer.

FIG. 9 depicts an apex view of exemplary embodiments of a portion of another magnetic read transducer 300'. For clarity, FIG. 9 is not to scale. The read transducer 300' may be part of a read head or may be part of a merged head that also includes a write transducer. The head of which the read transducer 300' is a part is contained in a disk drive having a media (not shown in FIG. 9), a slider and the head coupled with the slider. Further, only a portion of the components of the read transducer 300' are depicted. Thus, the transducer 300' may include or may omit a rear bias structure analogous to the rear magnetic bias structure 150.

The transducer 300' corresponds to the transducer(s) 300, 100, 100', 100" and/or 100'''. Consequently, analogous components are labeled similarly. For example, the transducer 300' includes components 310', 312, 314, 316, 318', 320, 322, 324, 340, 360, 362, 374, 372' and 370' that have an analogous structure and function to the corresponding components described above. Thus, the magnetic transducer 300' operates in an analogous manner to the transducer(s) 300, 100, 100', 100" and/or 100'''.

In addition, the magnetic transducer 300' has an extended length in the stripe height direction. Although the first reference layer 370' has been milled through, particular, portions of the reference layers 374 and 362 are longer in the stripe height direction than the free layer 324. In addition, the AFM layer 360 is longer in the stripe height direction. Because of its increased volume, the AFM layer 360 may be more magnetically stable. Pinning of the magnetic layer/third reference layer 362 may be improved. Stability of the reference layer and 374 may also be improved.

The magnetic transducer 300' may share the benefits of the magnetic transducer(s) 300, 100, 100', 100" and/or 100'''. The spacing between the shields 310' and 340, SS, may be reduced in the manner described above. Consequently, the magnetic transducer 300' may be suitable for high density magnetic recording applications.

Figure 10:
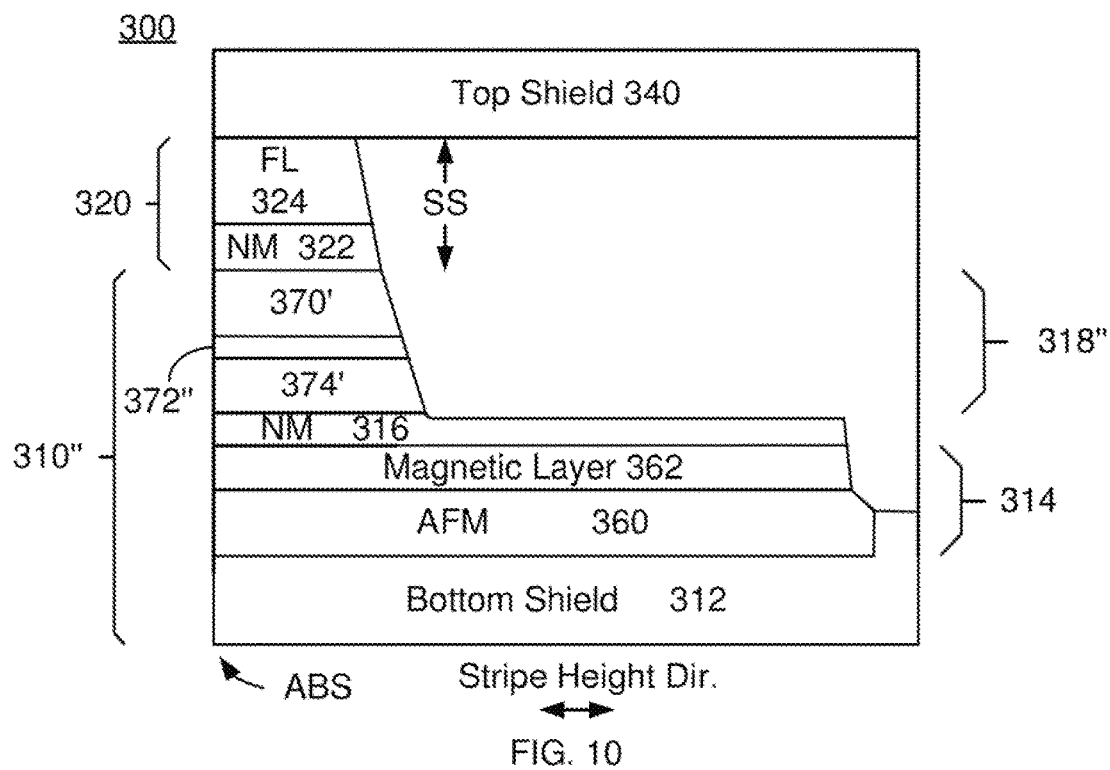
FIG. 10 depicts an apex view of another exemplary embodiment of a portion of a magnetic read transducer.

FIG. 10 depicts an apex view of exemplary embodiments of a portion of another magnetic read transducer 300". For clarity, FIG. 10 is not to scale. The read transducer 300" may be part of a read head or may be part of a merged head that also includes a write transducer. The head of which the read transducer 300" is a part is contained in a disk drive having a media (not shown in FIG. 10), a slider and the head coupled with the slider. Further, only a portion of the components of the read transducer 300" are depicted. Thus, the transducer 300" may include or may omit a rear bias structure analogous to the rear magnetic bias structure 150.

The transducer 300" corresponds to the transducer(s) 300, 300', 100, 100', 100" and/or 100'''. Consequently, analogous components are labeled similarly. For example, the transducer 300' includes components 310", 312, 314, 316, 318", 320, 322, 324, 340, 360, 362, 374', 372" and 370' that have an analogous structure and function to the corresponding components described above. Thus, the magnetic transducer 300" operates in an analogous manner to the transducer(s) 300, 300', 100, 100', 100" and/or 100'''.

The magnetic transducer 300" has an extended length in the stripe height direction. Although the layers 370', 372' and 374' have been milled through, particular, portions of the reference layers 374 and 362 are longer in the stripe height direction than the free layer 324. In addition, the AFM layer 360 is longer in the stripe height direction. Because of its increased volume, the AFM layer 360 may be more magnetically stable. Pinning of the magnetic layer/third reference layer 362 may be improved.

The magnetic transducer 300" may share the benefits of the magnetic transducer(s) 300, 300', 100, 100', 100" and/or 100'''. The spacing between the shields 310" and 340, SS, may be reduced in the manner described above. Consequently, the magnetic transducer 300" may be suitable for high density magnetic recording applications.

Figure 11:
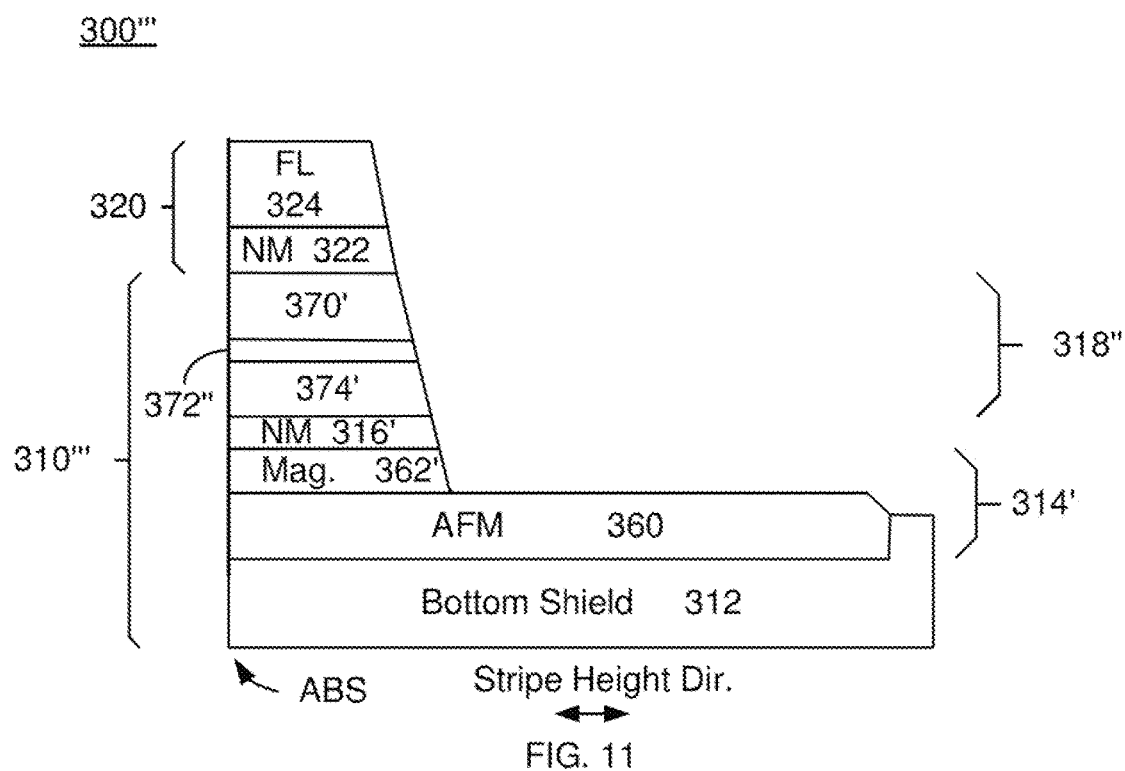
FIG. 11 depicts an apex view of another exemplary embodiment of a portion of a magnetic read transducer.

FIG. 11 depicts an apex view of exemplary embodiments of a portion of another magnetic read transducer 300'''. For clarity, FIG. 11 is not to scale. The read transducer 300''' may be part of a read head or may be part of a merged head that also includes a write transducer. The head of which the read transducer 300''' is a part is contained in a disk drive having a media (not shown in FIG. 10), a slider and the head coupled with the slider. Further, only a portion of the components of the read transducer 300" are depicted. Thus, the transducer 300''' may include or may omit a rear bias structure analogous to the rear magnetic bias structure 150.

The transducer 300''' corresponds to the transducer(s) 300, 300', 300", 100, 100', 100" and/or 100'''. Consequently, analogous components are labeled similarly. For example, the transducer 300' includes components 310''', 312, 314', 316', 318", 320, 322, 324, 340, 360, 362', 374', 372" and 370' that have an analogous structure and function to the corresponding components described above. Thus, the magnetic transducer 300''' operates in an analogous manner to the transducer(s) 300, 300', 300", 100, 100', 100" and/or 100'''.

The magnetic transducer 300''' has an extended length in the stripe height direction. The AFM layer 360 is longer in the stripe height direction. Because of its increased volume, the AFM layer 360 may be more magnetically stable. Pinning of the magnetic layer/third reference layer 362 may be improved.

The magnetic transducer 300''' may share the benefits of the magnetic transducer(s) 300, 300', 300", 100, 100', 100" and/or 100'''. The spacing between the shields 310''' and 340, SS, may be reduced in the manner described above. Consequently, the magnetic transducer 300''' may be suitable for high density magnetic recording applications.

The magnetic transducers 100, 100', 100", 100''', 300, 300', 300" and 300''' have been shown with various configurations to highlight particular features, such as differences in geometries. One of ordinary skill in the art will readily recognize that two or more of these features may be combined in various manners consistent with the method and system described herein that are not explicitly depicted in the drawings.

Figure 12:
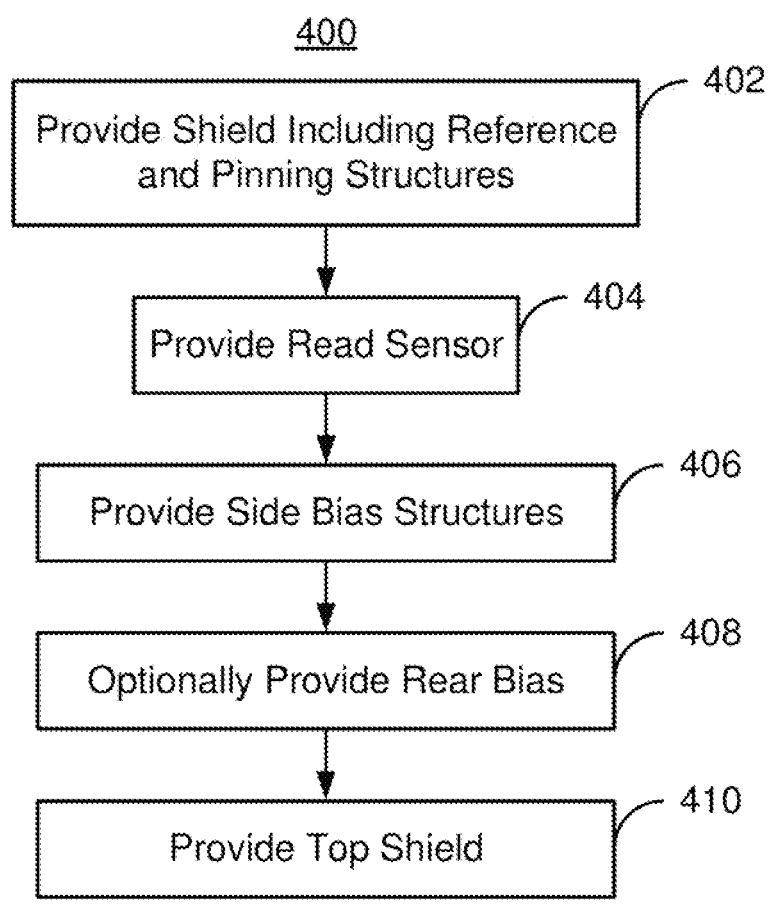
FIG. 12 is flow chart depicting an exemplary embodiment of a method for providing a magnetic recording read transducer.

FIG. 12 is an exemplary embodiment of a method 400 for providing a read transducer. For simplicity, some steps may be omitted, interleaved, combined, have multiple substeps and/or performed in another order unless otherwise specified. The method 400 is described in the context of providing a magnetic recording disk drive and transducer 100. However, the method 400 may be used in fabricating the transducer 100, 100', 100", 100''', 300, 300', 300" and/or 300'''. The method 400 may be used to fabricate multiple magnetic read heads at substantially the same time. The method 400 may also be used to fabricate other magnetic recording transducers. The method 400 is also described in the context of particular layers. A particular layer may include multiple materials and/or multiple sub-layers. The method 400 is described in the context of a disk drive. However, the method may be used in other applications employing a magnetoresistive and bias structures. The method 400 also may start after formation of other portions of the magnetic recording transducer.

A shield structure 110 is provided, via step 402. Step 402 thus includes providing the shield reference structure 118 and the shield pinning structure 114. The bottom shield 112 and the nonmagnetic coupling layer 116 may also be provided as part of step 402. Step 402 typically includes depositing the desired layers, defining their edges as well as one or more anneals to set the desired magnetic bias direction(s).

The read sensor 120 is provided, via step 404. Step 404 may include depositing a stack of layers for the read sensor and defining the read sensor in the cross-track and stripe height directions. Thus, the nonmagnetic layer 122 and the free layer 124 are provided in step 404. The capping layer 126 may also be fabricated. Further, the insulating layer 106 may also be provided.

The side bias structures 130 are provided, via step 406. Step 406 may include depositing the magnetic material(s) for the side bias structures 130 and planarizing the magnetic transducer.

The rear bias structure 150 may optionally be provided, via step 408. Step 408 may be performed after the sensor 120 has been defined in at least the stripe height direction. Thus, at least part of step 408 is performed after at least part of step 404. The top shield 140 is also provided, via step 410.

Using the method 400, the transducers 100, 100', 100", 100''', 300, 300', 300" and/or 300''' may be fabricated. Thus, the benefits of one or more of the transducers 100, 100', 100", 100''', 300, 300', 300" and/or 300''' may be achieved.

Figure 13:
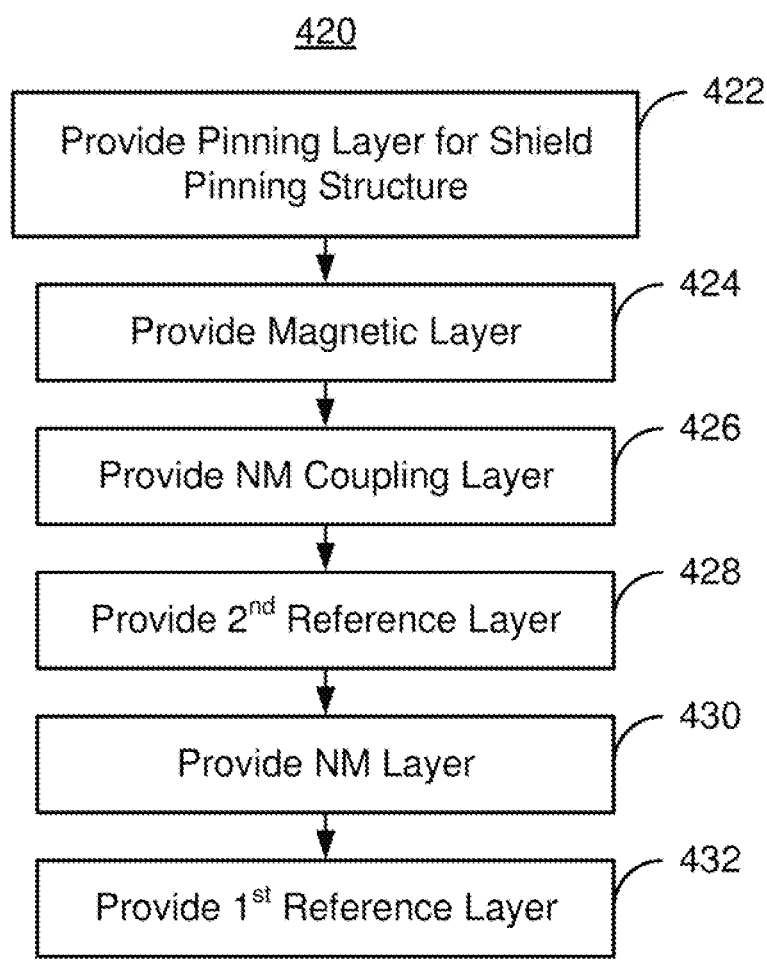
FIG. 13 is flow chart depicting another exemplary embodiment of a method for providing a magnetic recording read transducer.

FIG. 13 is an exemplary embodiment of a method 420 for providing the shield structure 110, 110', 110", 310, 310', 310" and/or 310''' of a read transducer. For simplicity, some steps may be omitted, interleaved, combined, have multiple substeps and/or performed in another order unless otherwise specified. The method 420 is described in the context of providing a magnetic recording disk drive and transducer 100". However, the method 210 may be used in fabricating the transducer 100, 100', 100", 100''', 300, 300', 300" and/or 300'''. The method 420 may be used to fabricate multiple magnetic read heads at substantially the same time. The method 420 may also be used to fabricate other magnetic recording transducers. The method 420 is also described in the context of particular layers. A particular layer may include multiple materials and/or multiple sub-layers. The method 420 is described in the context of a disk drive. However, the method may be used in other applications employing a magnetoresistive and bias structures. The method 420 also may start after formation of other portions of the magnetic recording transducer.

The pinning layer 160 is deposited, via step 422. Step 422 may include depositing an AFM layer, such as IrMn. The pinning layer 160 may also be annealed in a magnetic field. However, the annealing may take place after deposition of other portions of the magnetic transducer 100'.

The magnetic/third reference layer 162 may be provided, via step 424. The magnetic/third reference layer 162 may be deposited directly on the pinning layer 160. Thus, the layers 160 and 162 may be exchange coupled. As a result, the magnetic moment of the layer 162 may be substantially fixed. The shield pinning structure 114' may thus be fabricated in steps 422 and 424.

The nonmagnetic coupling layer 116 is provided, via step 426. Step 426 includes providing a desired thickness of the nonmagnetic coupling layer 116. Configuring the thickness of the layer 116 in step 426 allows for the desired magnetic coupling to be obtained between the pinning structure 114' and the reference structure 118'.

The second reference layer 174 is provided, via step 428. Step 428 includes depositing desired ferromagnetic material(s) at the desired thickness(es). The nonmagnetic layer 172 is provided, via step 430. Step 430 includes depositing the nonmagnetic layer 172 at the thickness for the desired RKKY coupling. The first reference layer 170 may then be provided, via step 432. Step 432 includes depositing desired ferromagnetic material(s) at the desired thickness(es). Steps 430 and 432 may be repeated to provide a shield reference structure having more layers. Step(s) 432, 430 and/or 428 may also include milling the layer(s) 170, 172 and 174 to provide the desired width(s) in the cross-track direction and the desired length(s) in the stripe height direction.

Thus, the magnetic transducer 100' may be fabricated. The method 420 may also be used to fabricate the transducer(s) 100, 100", 100''', 300, 300', 300" and/or 300'''. Thus, the benefits of one or more of the transducers 100, 100', 100", 100''', 300, 300', 300" and/or 300''' may be achieved. Consequently, shield-to-shield spacing for the transducer 100, 100', 100", 100''', 300, 300', 300" and/or 300''' may be reduced. Thus, readers for higher areal density disk drives may be fabricated.

We claim:

1. A magnetic read apparatus comprising:
a read sensor including a free layer having a side and a nonmagnetic spacer layer;
a shield structure including a shield pinning structure and a shield reference structure, the nonmagnetic spacer layer residing between the shield reference structure and the free layer, the shield reference structure residing between the shield pinning structure and the nonmagnetic spacer layer, the shield pinning structure including a pinned magnetic moment in a first direction, the shield reference structure including a shield reference structure magnetic moment weakly coupled with the pinned magnetic moment, the shield reference structure including a first reference layer adjacent to the nonmagnetic spacer layer, a second reference layer and a nonmagnetic layer between the first reference layer and the second reference layer, the first reference layer being between the nonmagnetic layer and the nonmagnetic spacer layer of the read sensor, the first reference layer being antiferromagnetically coupled with the second reference layer, the first reference layer being antiferromagnetically coupled with the second reference layer with a characteristic field of at least eight hundred and not more than two thousand Oe; and a side magnetic bias structure adjacent to the side of the free layer.

2. The magnetic read apparatus of claim 1 wherein the shield reference structure has a permeability of at least five and not more than eight hundred.

3. The magnetic read apparatus of claim 1 wherein the nonmagnetic spacer layer is an insulating tunneling barrier layer and wherein the nonmagnetic spacer layer adjoins the reference structure and the free layer such that a magnetoresistance for the read sensor is developed between the free layer and the shield reference structure.

4. The magnetic read apparatus of claim 1 wherein the first reference layer has a first thickness of at least two nanometers and not more than ten nanometers and wherein the second reference layer has a second thickness of at least three nanometers and not more than twenty nanometers.

5. The magnetic read apparatus of claim 1 wherein the shield structure further includes:
an additional nonmagnetic layer between the shield reference structure and the shield pinning structure;
wherein the shield pinning structure further includes a pinning layer and a magnetic layer magnetically coupled to the pinning layer, the magnetic layer having the pinned magnetic moment and being coupled to the second reference layer with an additional characteristic field of at least three hundred Oe and not more than one thousand five hundred Oe, the additional characteristic field being less than the characteristic, the second reference layer having the shield reference structure magnetic moment.

6. The magnetic read apparatus of claim 1 wherein the magnetic read apparatus further include an air-bearing surface (ABS), the magnetic read apparatus further comprising:
a rear magnetic bias structure configured to magnetically bias the read sensor in a stripe height direction perpendicular to the ABS, the read sensor being between the ABS and at least a portion of the rear magnetic bias structure.

7. The magnetic read apparatus of claim 6 further including:
an insulating, nonmagnetic layer between the read sensor and the rear magnetic bias structure.

8. The magnetic read apparatus of claim 1 further comprising:
a top shield, the read sensor residing between the shield structure and the top shield, the shield structure further including
a bottom shield, the shield reference structure and the shield pinning structure being between the read sensor and the bottom shield.

9. A magnetic read apparatus comprising:
a read sensor including a free layer having a side and a nonmagnetic spacer layer;
a shield structure including a shield pinning structure and a shield reference structure, the nonmagnetic spacer layer residing between the shield reference structure and the free layer, the shield reference structure residing between the shield pinning structure and the nonmagnetic spacer layer, the shield pinning structure including a pinned magnetic moment in a first direction, the shield reference structure including a shield reference structure magnetic moment weakly coupled with the pinned magnetic moment;
a nonmagnetic layer between the shield reference structure and the shield pinning structure; and
a side magnetic bias structure adjacent to the side of the free layer;
wherein the shield pinning structure further includes a pinning layer and a magnetic layer magnetically coupled to the pinning layer, the magnetic layer having the pinned magnetic moment and being coupled to the reference structure with a characteristic field of at least three hundred Oe and not more than one thousand five hundred Oe.

10. A magnetic read apparatus comprising:
a read sensor including a free layer having a side and a nonmagnetic spacer layer;
a shield structure including a shield pinning structure and a shield reference structure, the nonmagnetic spacer layer residing between the shield reference structure and the free layer, the shield reference structure residing between the shield pinning structure and the nonmagnetic spacer layer, the shield pinning structure including a pinned magnetic moment in a first direction, the shield reference structure including a shield reference structure magnetic moment weakly coupled with the pinned magnetic moment, the shield structure further including a nonmagnetic layer between the shield reference structure and the shield pinning structure; and
a side magnetic bias structure adjacent to the side of the free layer;
wherein the shield pinning structure further includes a pinning layer and a magnetic layer magnetically coupled to the pinning layer, the magnetic layer having the pinned magnetic moment and being coupled to the pinning layer with an additional characteristic field of at least eight hundred Oe and not more than one thousand five hundred Oe.

11. A data storage device comprising:
at least one medium; and
at least one slider including at least one magnetic transducer having an air-bearing surface (ABS) configured to reside in proximity to the at least one medium during use, the at least one magnetic transducer including a read sensor, a side magnetic bias structure and a shield structure, the read sensor including a free layer having a side and a nonmagnetic spacer layer, the shield structure including a shield pinning structure and a shield reference structure, the nonmagnetic spacer layer residing between the shield reference structure and the free layer, the shield reference structure residing between the shield pinning structure and the nonmagnetic spacer layer, the shield pinning structure including a pinned magnetic moment in a first direction, the shield reference structure including a shield reference structure magnetic moment weakly coupled with the pinned magnetic moment, the shield reference structure including a first reference layer adjacent to the nonmagnetic spacer layer, a second reference layer and a nonmagnetic layer between the first reference layer and the second reference layer, the first reference layer being between the nonmagnetic layer and the nonmagnetic spacer layer of the read sensor, the first reference layer being antiferromagnetically coupled with the second reference layer, the first reference layer being antiferromagnetically coupled with the second reference layer with a characteristic field of at least eight hundred and not more than two thousand Oe, the side magnetic bias structure being adjacent to the side of the free layer.

12. The data storage device of claim 11 wherein the magnetic read transducer further includes a rear magnetic bias structure and an insulating nonmagnetic layer between the read sensor and the rear magnetic bias structure, the rear magnetic bias structure configured to magnetically bias the read sensor in a stripe height direction perpendicular to the ABS, the read sensor being between the ABS and at least a portion of the rear magnetic bias structure.

13. A data storage device comprising:
at least one medium; and
at least one slider including at least one magnetic transducer having an air-bearing surface (ABS) configured to reside in proximity to the at least one medium during use, the at least one magnetic transducer including a read sensor, a side magnetic bias structure and a shield structure, the read sensor including a free layer having a side and a nonmagnetic spacer layer, the shield structure including a shield pinning structure and a shield reference structure, the nonmagnetic spacer layer residing between the shield reference structure and the free layer, the shield reference structure residing between the shield pinning structure and the nonmagnetic spacer layer, the shield pinning structure including a pinned magnetic moment in a first direction, the shield reference structure including a shield reference structure magnetic moment weakly coupled with the pinned magnetic moment, the side magnetic bias structure being adjacent to the side of the free layer;
wherein the shield reference structure includes a first reference layer adjacent to the nonmagnetic spacer layer, a second reference layer and a nonmagnetic layer between the first reference layer and the second reference layer, the first reference layer being between the nonmagnetic layer and the nonmagnetic spacer layer of the read sensor, the first reference layer being antiferromagnetically coupled with the second reference layer, the shield reference structure having a permeability of at least five and not more than eight hundred, the first reference layer being antiferromagnetically coupled with the second reference layer with a characteristic field of at least eight hundred and not more than two thousand Oe.

14. The data storage device of claim 13 further wherein the at least one magnetic transducer includes an additional nonmagnetic layer between the shield reference structure and the shield pinning structure, and wherein the shield pinning structure further includes a pinning layer and a magnetic layer magnetically coupled to the pinning layer, the magnetic layer having the pinned magnetic moment and being coupled to the second reference layer with an additional characteristic field of at least three hundred Oe and not more than one thousand five hundred Oe, the additional characteristic field being less than the characteristic, second reference layer includes the shield reference structure magnetic moment.

15. A method for providing a magnetic read apparatus having an air-bearing surface (ABS) comprising:
providing a read sensor including a free layer having a side and a nonmagnetic spacer layer;
providing a shield structure, the step of providing the shield structure further including
providing a shield pinning structure; and
providing a shield reference structure, the nonmagnetic spacer layer residing between the shield reference structure and the free layer, the shield reference structure residing between the shield pinning structure and the nonmagnetic spacer layer, the shield pinning structure including a pinned magnetic moment in a first direction, the shield reference structure including a shield reference structure magnetic moment weakly coupled with the pinned magnetic moment, the step of providing the shield reference structure further including
providing a first reference layer adjacent to the nonmagnetic spacer layer;
providing a second reference layer; and
providing a nonmagnetic layer between the first reference layer and the second reference layer, the first reference layer being between the nonmagnetic layer and the nonmagnetic spacer layer of the read sensor, the first reference layer being antiferromagnetically coupled with the second reference layer; and
providing a side magnetic bias structure adjacent to the side of the free layer;
wherein the first reference layer is antiferromagnetically coupled with the second reference layer with a characteristic field of at least eight hundred and not more than two thousand Oe.

16. The method of claim 15 wherein the shield reference structure has a permeability of at least five and not more than eight hundred.

17. The method of claim 15 wherein the nonmagnetic spacer layer being an insulating tunneling barrier layer and wherein the nonmagnetic spacer layer adjoins the reference structure and the free layer such that a magnetoresistance for the read sensor is developed between the free layer and the shield reference structure.

18. The method of claim 15 further comprising:
providing an additional nonmagnetic layer between the shield reference structure and the shield pinning structure;
wherein the step of providing the shield pinning structure further includes
providing a pinning layer; and providing a magnetic layer magnetically coupled to the pinning layer, the magnetic layer having the pinned magnetic moment and being coupled to the second reference layer with an additional characteristic field of at least three hundred Oe and not more than one thousand five hundred Oe, the additional characteristic field being less than the characteristic field, the second reference layer including the shield reference structure magnetic moment.

19. The method of claim 15 further comprising:

providing a rear magnetic bias structure configured to magnetically bias the read sensor in a stripe height direction perpendicular to the ABS, the read sensor being between the ABS and at least a portion of the rear magnetic bias structure; and providing an insulating nonmagnetic layer between the read sensor and the rear magnetic bias structure.

20. The method of claim 15 further comprising:

providing a top shield, the read sensor residing between the shield structure and the top shield, the shield structure further including providing a bottom shield, the shield reference structure and the shield pinning structure being between the read sensor and the bottom shield.

21. A method for providing a magnetic read apparatus comprising:

providing a read sensor including a free layer having a side and a nonmagnetic spacer layer;

providing a shield structure, the step of providing the shield structure further including providing a shield pinning structure;

providing a shield reference structure, the nonmagnetic spacer layer residing between the shield reference structure and the free layer, the shield reference structure residing between the shield pinning structure and the nonmagnetic spacer layer, the shield pinning structure including a pinned magnetic moment in a first direction, the shield reference structure including a shield reference structure magnetic moment weakly coupled with the pinned magnetic moment; and providing a nonmagnetic layer between the shield reference structure and the shield pinning structure; and providing a side magnetic bias structure adjacent to the side of the free layer;

wherein the shield pinning structure further includes a pinning layer and a magnetic layer magnetically coupled to the pinning layer, the magnetic layer having the pinned magnetic moment and being coupled to the reference structure with a characteristic field of at least three hundred Oe and not more than one thousand five hundred Oe.

* * * * *